United States Patent
Gottschlich et al.

(10) Patent No.: US 9,311,143 B2
(45) Date of Patent: Apr. 12, 2016

(54) METHODS AND SYSTEMS TO IDENTIFY AND REPRODUCE CONCURRENCY VIOLATIONS IN MULTI-THREADED PROGRAMS

(75) Inventors: Justin Gottschlich, Fort Collins, CO (US); Gilles Pokam, Fremont, CA (US); Cristiano Pereira, Santa Clara, CA (US); Jungwoo Ha, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/994,063

(22) PCT Filed: Dec. 21, 2011

(86) PCT No.: PCT/US2011/166520
§ 371 (c)(1),
(2), (4) Date: Jun. 13, 2013

(87) PCT Pub. No.: WO2013/095441
PCT Pub. Date: Jun. 27, 2013

(65) Prior Publication Data
US 2014/0115604 A1    Apr. 24, 2014

(51) Int. Cl.
G06F 9/46    (2006.01)
G06F 9/48    (2006.01)
G06F 11/36   (2006.01)
G06F 9/38    (2006.01)

(52) U.S. Cl.
CPC ............ *G06F 9/4881* (2013.01); *G06F 9/3851* (2013.01); *G06F 9/3861* (2013.01); *G06F 11/366* (2013.01); *G06F 11/3632* (2013.01); *G06F 11/3648* (2013.01)

(58) Field of Classification Search
None
See application file for complete search history.

(56) References Cited

U.S. PATENT DOCUMENTS

| | | | | |
|---|---|---|---|---|
| 6,009,269 | A * | 12/1999 | Burrows et al. | 717/130 |
| 7,100,157 | B2 | 8/2006 | Collard | |
| 7,539,979 | B1 * | 5/2009 | Nir-Buchbinder | 717/131 |
| 7,673,181 | B1 * | 3/2010 | Lindo et al. | 714/38.13 |
| 8,510,722 | B2 | 8/2013 | Yang et al. | |
| 8,572,606 | B1 * | 10/2013 | Agesen et al. | 718/1 |
| 2002/0035722 | A1 * | 3/2002 | Mckinsey et al. | 717/5 |

(Continued)

OTHER PUBLICATIONS

International Searching Authority, "The Written Opinion of the International Searching Authority," issued in connection with corresponding International Patent Application No. PCT/US2014/011424, mailed Apr. 29, 2014 (4 pages).

(Continued)

*Primary Examiner* — Emerson Puente
*Assistant Examiner* — Mehran Kamran
(74) *Attorney, Agent, or Firm* — Hanley, Flight & Zimmerman, LLC

(57) ABSTRACT

Methods and systems to identify and reproduce concurrency violations in multi-threaded programs are disclosed. An example method disclosed herein comprises determining whether a condition is met and serializing an operation of a first thread of a multi-threaded program relative to an operation of a second thread of the multi-threaded program. The serialization of the operations of the first and second threads results in a concurrency violation or bug thereby causing the multi-threaded program to crash. In this way, the operations of the first and second threads of the multi-threaded program that are responsible for the concurrency violation are identified and can be revised to remove the bug.

19 Claims, 11 Drawing Sheets

(56) References Cited

U.S. PATENT DOCUMENTS

| | | | |
|---|---|---|---|
| 2003/0233394 A1* | 12/2003 | Rudd et al. | 709/107 |
| 2005/0102681 A1* | 5/2005 | Richardson | 719/321 |
| 2006/0161897 A1* | 7/2006 | Biberstein et al. | 717/124 |
| 2007/0168986 A1 | 7/2007 | Pangburn | |
| 2008/0201629 A1* | 8/2008 | Duesterwald et al. | 714/798 |
| 2008/0250422 A1* | 10/2008 | Lewis | 718/107 |
| 2009/0100432 A1 | 4/2009 | Holloway et al. | |
| 2009/0113399 A1* | 4/2009 | Tzoref et al. | 717/130 |
| 2009/0125887 A1* | 5/2009 | Kahlon et al. | 717/126 |
| 2009/0178044 A1* | 7/2009 | Musuvathi et al. | 718/102 |
| 2009/0235262 A1 | 9/2009 | Ceze et al. | |
| 2010/0050161 A1* | 2/2010 | Nir-Buchbinder et al. | 717/126 |
| 2010/0070955 A1* | 3/2010 | Kahlon | 717/141 |
| 2010/0131931 A1* | 5/2010 | Musuvathi et al. | 717/128 |
| 2011/0022893 A1* | 1/2011 | Yang et al. | 714/33 |
| 2011/0131550 A1* | 6/2011 | Burckhardt et al. | 717/124 |
| 2011/0161590 A1* | 6/2011 | Guthrie et al. | 711/122 |
| 2011/0173422 A1* | 7/2011 | Chen et al. | 712/225 |
| 2011/0173592 A1* | 7/2011 | Elnozahy et al. | 717/131 |
| 2011/0258421 A1* | 10/2011 | Elnozahy et al. | 712/227 |
| 2012/0017221 A1* | 1/2012 | Hankins et al. | 719/318 |
| 2012/0144372 A1* | 6/2012 | Ceze et al. | 717/124 |
| 2012/0174074 A1* | 7/2012 | Ganai | 717/126 |
| 2012/0204062 A1* | 8/2012 | Erickson et al. | 714/35 |
| 2012/0204154 A1* | 8/2012 | Li et al. | 717/124 |
| 2013/0031531 A1 | 1/2013 | Keynes et al. | |
| 2013/0097136 A1* | 4/2013 | Goldberg | 707/704 |
| 2014/0007054 A1* | 1/2014 | Wu et al. | 717/124 |
| 2014/0108860 A1 | 4/2014 | Agesen et al. | |
| 2014/0282423 A1* | 9/2014 | Gottschlich et al. | 717/127 |

OTHER PUBLICATIONS

International Searching Authority, "The International Search Report," issued in connection with corresponding international Patent Application No. PCT/US2014/011424, mailed Apr. 29, 2014 (5 pages).

The United States Patent and Trademark Office, "Non-Final Office Action," issued in connection with U.S. Appl. No. 13/827,121 mailed on Jul. 7, 2014 (39 pages).

The United States Patent and Trademark Office, "Notice of Allowance," issued in connection with U.S. Appl. No. 13/535,334, mailed Aug. 27, 2014 (26 pages).

The United States Patent and Trademark Office, "Non-Final Office Action," issued in connection with U.S. Appl. No. 13/535,334 mailed on Feb. 13, 2014 (15 pages).

Wu et al.,"Methods and Systems to Identify and Reproduce Concurrency Violations in Multi-Threaded Programs Using Expressions," U.S. Appl. No. 13/535,334, filed Jun. 27, 2012 (75 pages).

Gottschlich et al., "Methods and Systems to Identify and Reproduce Concurrency Violations in Multi-Threaded Programs," PCT Patent Application No. PCT/US11/66520, filed Dec. 21, 2011 (50 pages).

Gottschlich et al., "Methods and Apparatus to Manage Concurrent Predicate Expressions," PCT Patent Application No. PCT/US2014/011424 filed Jan. 14, 2014, (39 pages).

Gottschlich et al., "Methods and Systems to Identify and Reproduce Concurrency Violations in Multi-Threaded Programs", PCT patent application No. PCT/US11/66520 filed Dec. 21, 2011 (50 pages).

Dinsdale-Young et al., "Concurrent Abstract Predicates," ECOOP 2010, Lecture Notes in Computer Science, vol. 6183, pp. 504-528 (25 pages).

Ceze et al., "A Case for System Support for Concurrency Exceptions," Mar. 2009, USENIX Conference, 12 pages.

The United States Patent and Trademark Office, "Notice of Allowance," issued in connection with U.S. Appl. No. 13/827,121, dated Mar. 30, 2015, 125 pages.

Campbell et al., "Path Expressions in Pascal," IEEE, Department of Computer Science, University of Illinois at Urbana-Champaign, 1979 (8 pages).

Schwartz-Narbonne et al., "Parallel Assertions for Debugging Parellel Programs," 2011 9th IEEE/ACM International Conference on Formal Methods and Models for Codesign (MEMOCODE), Jul. 2011, 181-190.

Siegel et al., "Collective Assertions," VMCAI' 11 Proceedings of the 12th international conference on verification model checking, and abstract interpretation, 2011, (17 pages).

"Methods and Systems to Identify and Reproduce Concurrency Violations in Multi-Threaded Programs Using Expressions," U.S. Appl. No. 13/535,334, filed Jun. 27, 2012 (75 pages).

International Searching Authority, "International Search Report" issued in connection with PCT application No. PCT/US2011/066520, mailed Aug. 31, 2012 (3 pages).

International Searching Authority, "Written Opinion" issued in connection with PCT application No. PCT/US2011/066520, mailed Aug. 31, 2012 (5 pages).

Park et al., "Concurrent Breakpoints," Electrical Engineering and Computer Sciences, University of California at Berkeley, Technical Report No. UCB/EECS-2011-159, Dec. 18, 2011, 15 pages.

Wikipedia, "Happened-before," retrieved from Wikipedia on Jan. 16, 2013, 2 pages.

Gottschlich, "Concurrent Predicates: Finding and Fixing the Root Cause of Concurrency Violations," Berkeley, CA, 2012, 7 pages.

Wikipedia, "Java Memory Model," retrieved from Wikipedia on Jan. 16, 2013, 3 pages.

"Methods and Apparatus to Manage Concurrent Predicate Expressions", U.S. Appl. No. 13/827,121, filed Mar. 14, 2013 (48 pages).

United States Patent and Trademark Office, "Non-Final Office Action," issued in connection with U.S. Appl. No. 13/535,334, mailed on Feb. 13, 2014, 26 pages.

European Patent Office, "Extended European Search Report", issued in connection with European Patent Application No. 11878226.7, dated Aug. 24, 2015 (7 pages).

International Searching Authority, "International Preliminary Report on Patentability", issued in connection with International Patent Application No. PCT/US2014/011424, dated Sep. 24, 2015 (6 pages).

\* cited by examiner

Thread 1
$T1_1$: lock();
$T1_2$: y = calculate();
$T1_3$: unlock();
$T1_4$: lock();
$T1_5$: if(y==0) y=1;
$T1_6$: unlock();

Thread2
$T2_1$: lock();
$T2_2$: a=x/y;
$T2_3$: unlock();

FIG. 2

Thread 1
$T1_1$: lock();
$T1_2$: y = calculate();
$T1_3$: unlock();
| First thread controller 12A |
$T1_4$: lock();
$T1_5$: if(y==0) y=1;
$T1_6$: unlock();

Thread2
| Second thread controller 12B |
$T2_1$: lock();
$T2_2$: a=x/y;
$T2_3$: unlock();

FIG. 2A cp1: cp(state, priority, control, sleep, sleepIfFalse, predicate)
cp2: {pre{/*serialized multi-ops*/}
cp3: if_satisfied{/*serialized multi-ops/*}
cp4: else{/*serialized multi-ops*/}
cp5: post{/*unserialized multi-ops*/}}

FIG. 4

Procedure verify(*state*)
SM1: S ← state.satisfied.size
SM2: N ← state.N
SM3: if state.to_satisfy =no_predicates ^ S = 0 then return *true*
SM4: else if state.to_satisfy =less_than_N ^ S < N then return *true*
SM5: else if state.to_satisfy =greater_than_N ^ S > N then return *true*
SM6: else if state.to_satisfy =equal_to_N ^ S = N then return *true*
SM7: else if state.to_satisfy =active_predicates ^ S = in_predicates then return *true*
SM8: end if
SM9:  return *false*
SM10:end procedure

FIG. 5

Require: *state* is shared memory
Require: *threadId* is the ID of the active thread
1: procedure CP(*state, priority, control, sleep, sleepIfFalse, predicate*)
2:     Lock *state.mutex*
3:     *executeIfSatisfied←false*
4:     Execute pre-execution operations
5:     Insert *threadId* into *state.in_predicate*
6:     if *control* then
7:         Insert (*threadID, priority*) into *state.priorities*
8:     end if
9:     Unlock *state.mutex*
10:    while *sleep>0* do
11:        *beginTime←Clock()*
12:        Lock *state.mutex*
13:        if *predicate* then
14:            Insert *threadId* into *state.satisfied*
15:        else
16:            Remove *threadId* from *state.satisifed*
17:        end if
18:        if *verify(state)^predicate* then
19:            *executeIfSatisfied←true*
20:            if¬*control* then
21:                No-Op
22:            else if *control ^ priority = state.top_priority* then
23:                Remove *threadId* from *state.satisfied*
24:                Remove *threadId* from *state.in_predicates*
25:                Remove (*threadId, priority*) from *state.priorities*
26:                Execute if_satisfied operations
27:                Unlock *state.mutex*
28:                Break
29:            end if
30:        end if
31:        Unlock *state.mutex*
32:        if¬*sleepIfFalse* then
33:            Break
34:        end if
35:        *SLEEP(1)*
36:        *endTime←Clock()*
37:        *sleep←sleep-(endTime-beginTime)*
38:    end while
39:    if ¬*executeIfSatisfied* then
40:        Execute else operations
41:    end if
42:    Unlock *state.mutex*
43:    Execute post-execution
44: end procedure

FIG. 11

METHODS AND SYSTEMS TO IDENTIFY AND REPRODUCE CONCURRENCY VIOLATIONS IN MULTI-THREADED PROGRAMS

FIELD OF THE DISCLOSURE

This disclosure relates generally to multi-threaded programs and more particularly to debugging concurrency violations occurring in multi-threaded programs.

BACKGROUND

In recent years, concurrent/parallel programming in which different computer programs execute simultaneously and access shared memory has become quite popular. Concurrently executing programs that operate within the context of a single computer program are commonly referred to as threads of a multi-threaded program. Multi-threaded programming has inherent challenges both because of the simultaneous nature of the execution of the threads and because the different threads of the program have access to shared memory. As a result of the simultaneous executions of the threads, operations performed by the threads do not necessarily occur in any particular order. However, there are instances in which proper operation of the multi-threaded program requires that one or more of the operations performed in one or more threads be performed in a specific order relative to the operations of one or more other threads. For example, two or more threads that access the same memory location may rely on a specific value or values being present in the shared memory location when that shared memory location is accessed. However, the specific value or values in the shared memory location when that memory location is accessed by any given thread may depend on the order in which one or more of the threads access the shared memory location. Further, ensuring the order in which a shared memory location is accessed by any given thread in a multi-threaded program is very difficult to control given the simultaneous operation of the various threads.

Programmers often use compound statements and mutually exclusive locks to properly order the operations performed in one thread with respect to the operations performed in another thread. This process of ordering the operations is referred to as serialization. However, the locks and compound statements must be placed in any given thread or threads in a position(s) that causes the desired order of operations to be performed. When these locks and/or compound statements are not properly placed, the desired order of operations is not achieved and a concurrency violation may result thereby causing a computer crash, an incorrect program output or other undesirable outcome(s).

Fixing any computer error, or bug, including those caused by a concurrency violation generally involves reproducing the bug so that the bug can be properly identified and so that the responsible portions of the program can be modified to correct the bug. Debugging in the context of a serial program is fairly straightforward as it involves sequentially stepping through the instructions of the code until the bug occurs and then revising the instructions responsible for the bug. However, this method of debugging does not work well in a multi-threaded program because the order in which the instructions of the various threads of a multi-threaded program are executed is unknown and, indeed, may vary during any given execution of the program. In fact, a particular bug present in a multi-threaded program may not occur upon every execution of the program (i.e., the bug may be non-deterministic).

BRIEF DESCRIPTION OF THE DRAWINGS

FIG. 2 illustrates the operations, represented in pseudo code, of a first and second thread of an example multi-threaded program.

FIG. 2A illustrates the operations, represented in pseudo code, of a first and second thread of an example multi-threaded program having a first thread controller and a second thread controller inserted into the first and second threads, respectively.

FIG. 4 illustrates the example operations, represented in pseudo code, of an example control structure used to control the operations of the example first thread controller and second thread controllers of FIGS. 1 and/or 3.

FIG. 5 illustrates example operations, represented in pseudo code, of an example status monitor of the example multi-thread controller of FIG. 3.

FIG. 11 illustrates pseudo code that may be used to implement the operations of the control structure of FIG. 4.

DETAILED DESCRIPTION

Methods and systems to identify, reproduce and/or repair concurrency violations in multi-threaded programs are disclosed herein. In an example method one or more operations performed by a first thread of a multi-threaded program are serialized relative to one or more operations performed by a second thread of the multi-threaded program when one or more conditions have been met. In at least some examples, the serialization of the operations of the first and second threads causes a concurrency violation to occur.

Unlike existing debugging tools which are only able to identify that the execution of a multi-threaded program has resulted in one or more concurrency violations, debugging tools disclosed here are able to reproduce a concurrency violation so that the operations responsible for the violation are identified and can be revised. In addition, debugging tools disclosed here can be used after the program has been revised to determine whether the revisions have effectively removed the bug. Also, debugging tools disclosed here do not produce the false positives which often result from using existing debugging tools.

Figure 1:
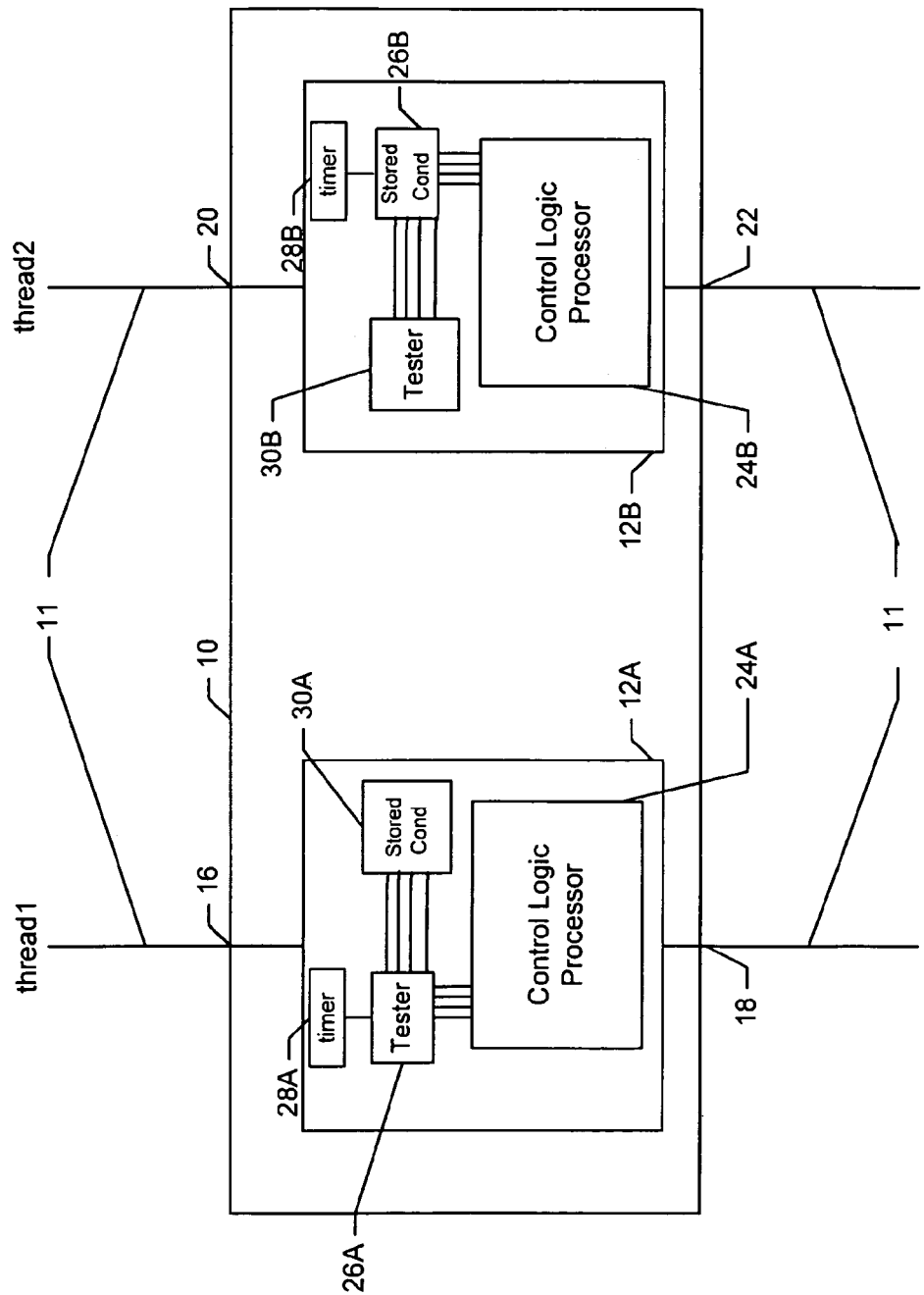
FIG. 1 is block diagram of an example tool, implemented as a multi-thread controller, for reproducing concurrency violations in a multi-threaded program.

A block diagram of an example debugging tool 10 to reproduce a concurrency violation in a multi-threaded program 11 is illustrated in FIG. 1. The example tool 10 of FIG. 1 is a multi-thread controller 10 that includes a first thread controller 12A and a second thread controller 12B which control the forward progress of a first thread, thread1, and a second thread, thread2, respectively, of the multi-threaded program 11. The first and second thread controllers 12A, 12B of the illustrated example are placed at specific locations 16, 18, 20, 22 in thread1 and thread2 that are in or near the portions of thread1 and thread2 responsible for causing the concurrency violation. For instance, in the example of FIG. 1, when the specific location 16 is reached, the first thread controller 12A becomes active and operates to control the forward progress of thread1 until execution of the specific location 18 is reached or until the concurrency violation occurs. Likewise, when execution of the specific location 20 is reached, the second thread controller 12B becomes active and operates to control the forward progress of thread2 until execution of the specific location 22 is reached or until the concurrency violation occurs. Thus, each thread controller 12A, 12B of the illustrated example becomes part of its respective thread. As is described in greater detail below, one or more of the operations performed by the first and second thread controllers 12A, 12B may replace one or more of the operations performed by thread1 and/or thread2, respectively.

The first example thread controller 12A of FIG. 1 is implemented as a control logic processor 24A that performs one or more desired operations depending on the output of a condition tester 26A. The condition tester 26A of the illustrated example determines whether one or more conditions have been met within a pre-defined or threshold amount of time as indicated by a timer 28A. The conditions are stored in a memory 30A and include a set of predefined variables. When a desired number of the conditions are met, the first and second thread controllers 12A, 12B of the illustrated example coordinate to serialize one or more of the operations performed by either thread1 or thread2 relative to one or more of the operations performed by thread1 or thread2.

Example implementations of the first and second controllers 12A, 12B are illustrated in FIG. 1. In the example of FIG. 1, elements included in the first and second controllers 12A, 12B having similar functionality are labeled with the same reference numeral, with a suffix A being used to refer to elements associated with the first thread controller 12A and a suffix B being used to refer to elements associated with the thread controller 12B. Due to the similar functionality of the elements of the first and second thread controllers 12A, 12B, and for brevity, only the functionality of the first example thread controller 12A is described for FIG. 1. The interested reader is referred to the description of the like numbered elements of the first example thread controller 12A for an understanding of the second example thread controller 12B.

In a debugging environment, the programmer may not know exactly which portions of thread1 and thread2 are responsible for causing a concurrency violation, (e.g, the programmer may not know where the bug is located). Thus, in the example of FIG. 1, the programmer is assumed to have made an educated guess about where the specific points 16, 18, 20, 22 are located and what conditions must be met for the concurrency violation to occur. Provided that the programmer's educated guess is accurate, the concurrency violation is reproduced, (e.g., the bug occurs, and the programmer is able to identify the responsible, defective operations of thread1 and thread2). If the concurrency violation does not occur when thread1 and thread2 are executed with the first and second controllers 12A, 12B in place, the programmer is able to identify the corresponding portions of thread1 and thread2 as not being responsible for the bug. The programmer may then make an educated guess about what other portions of thread1 and thread2 might be causing the concurrency violation. The programmer then reconfigures and moves the first and second example thread controllers 12A, 12B to different locations in the threads in an attempt to reproduce the concurrency violation. This process of locating the portions of thread1 and thread2 responsible for the concurrency violation is sometimes referred to as a divide-and-conquer technique.

Upon isolating the defective operations of thread1 and thread2 responsible for the bug, the programmer may revise those operations in an attempt to remove the bug. The programmer may then re-execute thread1 and thread2 with the first and second thread controllers 12A, 12B in place. If the bug occurs again, then the programmer may further revise the defective thread operations. If the bug does not occur again, and provided that the example thread controllers have been properly configured, the programmer has confidence that the bug has been removed and/or repaired.

An example set of operations performed by thread1 and thread2 of FIG. 1 are described using the pseudo code of FIG. 2. In this example, the execution of thread1 and thread2 may cause a concurrency violation resulting from a divide by zero exception. The exception occurs when thread2 executes a divide instruction using a divisor, y, that is equal to zero. The divisor, y, is stored as a variable in a shared memory location. Thread1 also operates on the variable, y, and can cause the variable, y, to equal zero. If thread1 detects that the variable, y, stored in the shared memory is zero, then thread1 replaces the zero with a non-zero value. In this example, the divide by zero exception will occur only when the variable, y, stored in the shared memory equals zero and thread2 performs the divide operation before thread1 has reset the shared memory to a non-zero value. Thus, to reproduce the concurrency violation, the operations of thread1 and thread2 are serialized in a manner that causes thread2 to perform the divide operation while the divisor, y, stored in the shared memory is zero.

Referring still to FIG. 2, thread1 begins, as reflected by lines $T1_1$-$T1_3$ of the pseudo code, by obtaining a lock to prevent thread2 from accessing the shared memory where y is stored. Upon obtaining the lock, thread1 calculates the value of y. In this example, the specific calculation performed to obtain y is not relevant. It matters only that the calculation may cause the value of y to equal zero. After the calculation of y, the lock is released such that either of thread1 or thread2 may access the shared memory in which y is stored. As reflected in lines $T1_4$-$T1_6$ of FIG. 2, thread1 then obtains the lock a second time and checks to determine whether the value of y equals zero. If so, thread1 resets the value of y to equal one to avoid the divide by zero exception that might otherwise occur if thread2 were to perform a divide operation using a divisor of zero. Thread1 then releases the lock.

Thread2 begins, as reflected in lines $T2_1$-$T2_3$ of FIG. 2, by obtaining the lock to prevent thread1 from accessing the shared memory where y is stored. Thread2 then performs the divide operation using y as a divisor, after which thread2 releases the lock. During many iterations of the multi-threaded program 11, when thread1 calculates a value of y that is equal to zero, thread1 will reset the value of y to one before thread2 performs the divide operation. However, there may be instances in which thread1 calculates a value of y equal to zero and then both thread1 and thread2 reach for the lock at the same time. If thread2 obtains the lock before thread 1 and thus, before thread1 has reset y to a non-zero value, then the divide by zero exception may occur.

Referring now to FIG. 1 and FIG. 2, in some examples, the first and second example thread controllers 12A, 12B control thread1 and thread2, respectively, where both threads operate as described in connection with FIG. 2. In the example of FIG. 2A, the first thread controller 12A is located in thread1 after the operations reflected by lines $T1_1$-$T1_3$ of FIG. 2 and before the operations reflected by lines $T1_4$-$T1_6$. In this example, the condition that will cause the serialization of thread1 relative to thread2 occurs when the condition y equals zero is met.

In the example of FIG. 2A, the second thread controller 12B is placed at the beginning of thread2. As a result, at the beginning of the execution of thread2, the example condition tester 26B tests for the condition y equal 0 and tests the output of the timer 28B to determine whether a predefined amount of time has elapsed. If the condition y equal zero has not been met and the output of the timer 28B indicates that the predefined amount of time has not elapsed, the control logic processor 24B of the illustrated example stalls the second thread controller 12B thereby causing the forward progress of thread2 to at least temporarily stall or be otherwise postponed. While thread2 is stalled, the condition tester 26B of the illustrated example retests the value of y and the output of the timer 28B until either the condition y equals zero has been met or until the predefined amount of time has elapsed.

The first example thread controller 12A begins to operate after the first instance in which the lock is released in thread1 (see line $T1_3$ of FIG. 2A). The example condition tester 26A determines whether the condition y equals zero has been met. If y does not equal zero, the control logic processor 24A causes the first thread controller 12A to release control of thread1.

If y is equal to zero, the control logic processor 24A stalls or otherwise postpones the forward progress of thread1 until either a predefined amount of time has elapsed, as measured by the timer 28A, or until a computer program crash occurs. Additionally, the control logic processor 24B of the illustrated example unstalls the operation of the second example thread controller 12B to permit performance of the operations reflected by lines $T2_1$-$T2_3$ (see FIG. 2A) which include 1) obtaining the lock $T2_1$, 2) performing the divide operation $T2_2$, and 3) releasing the lock $T2_3$. In the illustrated example, when the example control logic processor 24B performs the divide operation $T2_2$, the value of the divisor, y, is guaranteed to equal zero due to the coordinated operation of the first thread controller 12A and the second thread controller 12B. As a result, a concurrency violation caused by the divide by zero exception occurs causing the multi-threaded program 11 to crash, as intended. In this way, the first and second thread controllers 12A, 12B serialize the operations of thread1 and thread2 to ensure that the control logic processor 24B performs the divide operation when y equals zero. The resulting crash informs the programmer that the relevant portions of thread1 and thread2 are likely responsible for the bug and should be revised.

As described above, if the condition y equal zero is not met, the control logic processor 24A of the illustrated example causes the first thread controller 12A to release control of thread1 thereby allowing the operations reflected by lines $T1_4$-$T1_6$ of FIG. 2 to execute. In addition, the control logic processor 24B of the illustrated example performs the operations reflected by lines $T2_1$-$T2_3$ of FIG. 2A of thread2. Because y does not equal zero in this instance; the divisor, y, is a non-zero value, so performing the divide operation does not cause the computer to crash. Because a crash fails to occur, the relevant portions of thread1 and thread2 are not responsible for the concurrency violation or the relevant portions have been properly repaired, depending on how the thread controllers 12A and 12B are being used.

In the above example, the operation of the first and second thread controllers 12A, 12B depends, at least in part, on the condition y equals zero being met and/or on the predefined amount of time having elapsed. Depending on the thread being controlled, the operation of the first and second thread example controllers 12A, 12B need not depend on the same condition being met and/or the predefined amounts of time as measured by the timers 28A and 28B need not be equal. Also, as is described above, the example thread controllers 12A, 12B may be configured to replace any, all or none of the operations performed by the thread being controlled.

In addition, although FIGS. 1 and 2 have illustrated an example multi-threaded program 11 having two threads, the multi-threaded program 11 may include any number of threads and may be controlled by any number of thread controllers. Further, any number of the thread controllers may be operating or "active" at any given time. The operation, configuration and components of the thread controllers 12A, 12B may vary depending on the thread being controlled and/or on the type of concurrency violation being reproduced.

In some examples, the start of the operation of the second thread controller 12B occurs before the start of the operation of the first thread controller 12A. However, other orders of operation may be employed. For example, by requiring the condition y is equal to zero be met before the serialization of thread1 and thread2 will proceed, the order in which the first and second thread controllers 12A, 12B actually begin to operate is not important.

Figure 3:
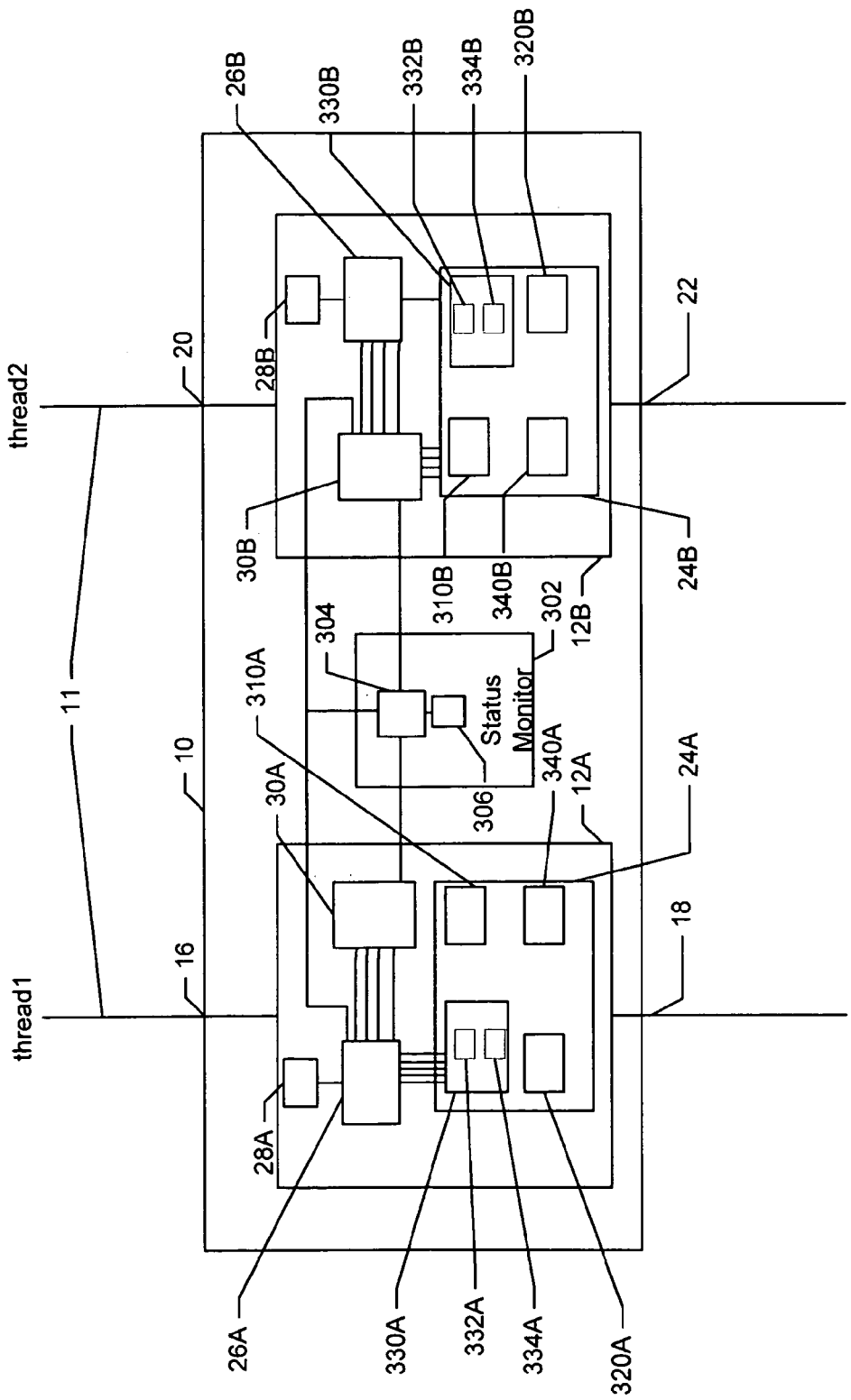
FIG. 3 is a block diagram of an example implementation of the multi-thread controller of FIG. 1.

FIG. 3 illustrates an example implementation of the multi-thread controller 10 of FIG. 1 in which the example thread controllers 12A, 12B perform a variety of operations illustrated by the example pseudo code of FIG. 4. The example pseudo code of FIG. 4 defines a control structure used to control the operation of the thread controllers 12A and 12B. In this example, the multi-thread controller 10 includes a status monitor 302 having a condition tester 304 to determine whether a desired number of conditions have been concurrently satisfied. Each condition (e.g., a predicate), represents a thread condition that must be met before the serialization of the threads will result in a concurrency violation. When a desired number of predicates are concurrently satisfied (also referred to herein as concurrent predicates), the output of the status monitor 302 is set to true. Once the output of the status monitor 302 is true, and depending on one or more other conditions, the control logic processors 24A, 24B coordinate to serialize the operations of thread1 relative to the operations of thread2.

In this example, the control logic processor 24A is implemented to include an invoker processor 310A, a pre-operations processor 320A, a conditional operations processor 330A, and a post operations processor 340A.

The invoker processor 310A of the illustrated example causes the first thread controller 12A to begin operating and defines a set of parameters referred to as state, $priority_A$, $control_A$, $sleep_A$, $sleepIfFalse_A$ and $predicate_A$ as reflected in line cp1 of FIG. 4. The parameters are stored in the memory 30A, and as are described below, the parameters are evaluated by the condition tester 26A to control the operation of the conditional operations processor 330A.

The pre-operations processor 320A of the illustrated example operates after the invoker processor 310A and performs any number of serialized operations as reflected in line cp2 of FIG. 4. In some examples, the serialized operations include initializing a set of variables to ensure the proper operation of the first thread controller 12A. The serialized operations performed by the pre-operations processor 320A of the illustrated example will vary depending on the thread(s) being controlled and by the type(s) of concurrency violation being reproduced. For example, the pre-operations processor can define shared-memory counters to detect certain concurrency violations that are not intended to be detected using the control structure represented by the pseudo code of FIG. 4. Some such concurrency violations include deadlocks and livelocks that happen when at least some of a defined set of events occur in, for example, some undesired order.

The conditional operations processor 330A of the illustrated example performs either of a first or second set of serialized operations 332A, 334A as reflected in lines cp3 and cp4 of FIG. 4, depending on the presence or absence of the parameters defined by the invoker processor 310A, the output of the timer 28A and the output of the status monitor 302. The first set of operations (which may include any number of operations including zero and one) is referred to as the satisfied operations 332A and the second set of operations (which may include any number of operations including zero and one) is referred to as the not satisfied operations 334A. The satisfied operations 332A are performed when the condition(s) required for a concurrency violation have been met. In some examples, the condition(s) must be met within a predefined (e.g., a threshold) amount of time as measured by the timer 28A. The satisfied operations 332A may include any number of operations. The specific operations will vary depending on the thread(s) being controlled and the type(s) of concurrency violation(s) being reproduced.

The conditional operations processor 330A of the illustrated example performs the not satisfied operations 334A when the conditions required for performance of the satisfied operations 332A are not met. In some examples, the not satisfied operations 334A will not be performed until a predefined (e.g., threshold) amount of time, as measured by the timer 28A, has elapsed. Thus, in the illustrated example, the not satisfied operations 334A are performed when the conditions required to cause the concurrency violation have not been met. The not satisfied operations 334A may include any number of operations. The specific operations will vary depending on the thread(s) being controlled and the type(s) of concurrency violation(s) being reproduced.

Before control of thread1 is released, after either the satisfied operations 332A or not satisfied operations 334A have been performed, the post operations processor 340A of the illustrated example performs any number of clean-up operation(s) that may be needed, as reflected in line cp5 of FIG. 4.]. The clean-up operation(s) performed by the post-operations processor 340A of the illustrated example will vary depending on the thread(s) being controlled and the type(s) of concurrency violation(s) being reproduced.

As described above, the parameters defined by the invoker processor 310A in the illustrated example are used to determine whether the conditional operations processor 330A will perform the satisfied operation(s) 332A or the not satisfied operation(s) 334A. In some examples, the predicate$_A$ parameter is a boolean value and represents one of the conditions that must be met (e.g., must return true) before the conditional operations processor 330A will perform the satisfied operations 332A. In addition, the output of the status monitor 302 and the control$_A$ parameter of the illustrated example must return "true."

In the examples of FIGS. 3 and 4, the state parameter is used by the status monitor 302A to generate an output hereinafter referred to as "verify(state)." As described above, the output of the status monitor 302 is one of the pre-defined conditions to be met in order for the satisfied operations 332A to be performed. The status monitor 302 determines whether a desired number of active thread controllers concurrently have a predicate parameter that is met. When the desired number of active thread controllers have a predicate parameter that is met, verify(state) returns true. As described previously, more than one thread controller may be active at any given time. In some examples, a variable N represents a value used to evaluate whether the required number of concurrent predicates are present before the output of the status monitor 302, verify(state), will return true. In the illustrated example, a conditional operator, to_satisfy, is applied to N to test whether the required number of concurrent predicates are present. Additionally, in the illustrated example, a variable set referred to as "satisfied predicates" contains a list of threadIDs, each threadID identifying an active, unique thread having a satisfied predicate. In the illustrated example, a variable S represents the number of threadIDs contained in the satisfied predicates variable set at any given time such that S is equal to the number of active threads having predicates that are concurrently satisfied, (e.g, S represents the actual number of satisfied concurrent predicates at any given time). In the example of FIG. 3, the variables N, to_satisfy, satisfied predicates, and S are all stored in a memory 306 included in the status monitor 302.

FIG. 5 illustrates an example set of operations, represented in pseudo code, performed by the example status monitor 302 of FIG. 3 to generate the output, verify(state). The example operations of FIG. 5 begin when the status monitor 302 accesses the memory 306 to obtain the values N and to_satisfy both of which are previously defined based on programmer supplied information. The status monitor 302 of the illustrated example sets the variable S equal to the number of threadIDs contained in "satisfied predicates" set as represented by line SM1 of FIG. 5. After the variables N and to_satisfy are obtained, the status monitor 302 determines when the actual number of satisfied concurrent predicates, S, reaches the threshold number of concurrent predicates based on the value of N and the conditional operator to_satisfy as represented by lines SM3-SM7 of FIG. 5. If the threshold number of predicates is equal zero, and the actual number of satisfied predicates equals zero, the output of the status monitor returns true as reflected by line SM3 of FIG. 5. If the threshold number of predicates is less N and the actual number of satisfied predicates, S, is less than N, the output of the status monitor returns true as reflected by line SM4 of FIG. 5. If the threshold number of predicates is greater than N and the actual number of satisfied predicates, S, is greater than N, the output of the status monitor 302 returns true as reflected by line SM5 of FIG. 5. If the threshold number of predicates is equal to N and the actual number of satisfied predicates, S, is equal to N, the output of the status monitor 302 returns true as reflected by line SM6 of FIG. 5. If the threshold number of predicates is equal to a variable called "active_predicates" and the actual number of satisfied predicates, S, is equal to the value of a variable "in_predicates," the output of the status monitor 302 returns true as reflected by line SM7 of FIG. 5. In some examples, the variable active_predicates is a value set by the programmer. The variable in_predicates is a set of threadIDs identifying threads that are actively being controlled by the thread controllers. When at least one of the evaluations performed by the status monitor 22A are true, verify(state) returns true. If none of the evaluations are true, verify(state) returns false.

Referring again to the examples of FIG. 3 and FIG. 4, the priority$_A$ parameter of the illustrated example is a 32-bit unsigned value representing the priority of the first thread controller 12A, wherein 0 is the highest priority and 4,294,967,295 is the lowest priority. The priority parameter of any given thread controller determines the order in which that thread controller will perform its satisfied operations relative to other thread controllers. For example, the thread controller having the highest priority parameter is guaranteed to perform its satisfied operations before any other thread controller having a lower priority parameter. The priority parameters of the various thread controllers are not required to be unique so that, in the event of a priority parameter tie, the order is not important and no specific order is guaranteed. Additional detail about how the example priority$_A$ parameter can be used to control, at least part, whether the first thread controller 12A will be permitted to perform the satisfied operations 332A relative to any other thread controller is provided below.

The control$_A$ parameter of the illustrated example is a boolean value and represents one of the conditions that, in combination with verify(state), the predicate$_A$ parameter and the priority$_A$ parameter, controls whether the conditional operations processor 330A will perform the satisfied operations 332A. In one example, if the control$_A$ parameter is false, then the conditional operations processor 330A will not perform the satisfied operations 332A regardless of whether verify (state) and the predicate$_A$ parameter are true. Instead, the conditional operations processor 330A will perform the not satisfied operations 334A. In the example, if the control$_A$ parameter is true and depending on other conditions, as described below, the first thread controller 12A may 1) perform the not satisfied operations 334A, 2) allow additional time for the conditions required for the performance of the satisfied operations 332A to be met, or 3) perform the satisfied operations 332A.

The sleep$_A$ parameter of the illustrated example is a predefined (e.g., threshold) amount of time, in milliseconds, that the first thread controller 12A will allow the conditions required for the performance of the satisfied operations 332A to be met before performing the not satisfied operations 334A. In one example, the first thread controller 12A will continue to wait for the conditions required for the satisfied operations to be met provided that any of 1) the verify(state) parameter or 2) the control$_A$ parameter are false, or the 3) the priority$_A$ parameter is not the highest priority of the threads that are actively being controlled, provided that 1) the predicate$_A$ parameter is true, or 2) the predicate$_A$ parameter is false and the sleepIfFalse$_A$ parameter (described below) is true. In this example, if the foregoing conditions are met, the sleep$_A$ parameter is tested by the condition tester 26A against the output of the timer 28A. If the sleep$_A$ parameter exceeds the output of the timer 28A, the conditions required for the performance of the satisfied operations 332A have not yet been met and the predefined (e.g., threshold) amount of time has not yet expired. In this case, the first thread controller 12A will allow additional time for the conditions required for the performance of the satisfied operations 332A to be met.

In this example, if the sleep$_A$ parameter does not exceed the output of the timer 28A, the conditions required for the performance of the satisfied operations 332A have not yet been met and the predefined (e.g., threshold) amount of time has expired. In this case, the bug has not been detected either because the programmer's educated guess about where the bug is located is incorrect, because the bug has been repaired, or because the amount of time allotted to allow for the satisfied operations 332A to occur is insufficient.

In this example, if any of 1) the predicate$_A$ parameter, 2) the verify(state) parameter or 3) the control$_A$ parameter are false, or the 4) priority$_A$ is not the highest priority of the threads that are actively being controlled. And additionally if the sleepIfFalse$_A$ parameter (described below) and the predicate$_A$ parameter are both false, the not satisfied operations 334A will be performed because the programmer has decided, by setting the sleepIfFalse$_A$ parameter to false, that additional time for the satisfied operations to be performed shall not be permitted.

In this example, if 1) the predicate$_A$ parameter, 2) the verify (state) parameter, 3) the control$_A$ parameter are all true, and 4) the priority$_A$ is the highest priority of the threads that are actively being controlled, the bug exists and the conditional operations processor 330A performs the satisfied operations 332A causing the computer program to crash.

The sleepIfFalse$_A$ parameter of the illustrated example is a boolean value and, as described above, controls, at least in part, whether the first thread controller 12A will allow additional time for the conditional operations processor 330A to perform the satisfied operations 332A. Specifically, as described above, if the predicate$_A$ parameter is true, or if the predicate$_A$ parameter is false and the sleepIfFalse$_A$ parameter is true, the first thread controller 12A will allow additional time for the conditional operations processor 330A to perform the satisfied operations 332A, provided that the predefined (e.g., threshold) amount of time has not yet expired. If the predicate$_A$ parameter is false and the sleepIfFalse$_A$ parameter is false, the first thread controller 12A will not allow additional time for the conditional operations processor 330A to perform the satisfied operations 332A even though the predefined (e.g., threshold) amount of time may not have expired.

In the example of FIG. 3, elements included in the first and second controllers 12A, 12B having similar functionality are labeled with the same reference numeral, with a suffix A being used to refer to elements associated with the first thread controller 12A and a suffix B being used to refer to elements associated with the second thread controller 12B. Due to the similar functionality of the elements of the first and second thread controllers 12A, 12B, and for brevity, only the functionality of the first thread controller 12A is described for FIG. 3. The functionality of similarly numbered structures is similar and will not be revisited here. The interested reader is referred to the above description of the like numbered structures for a full description of the same.

Figure 6:
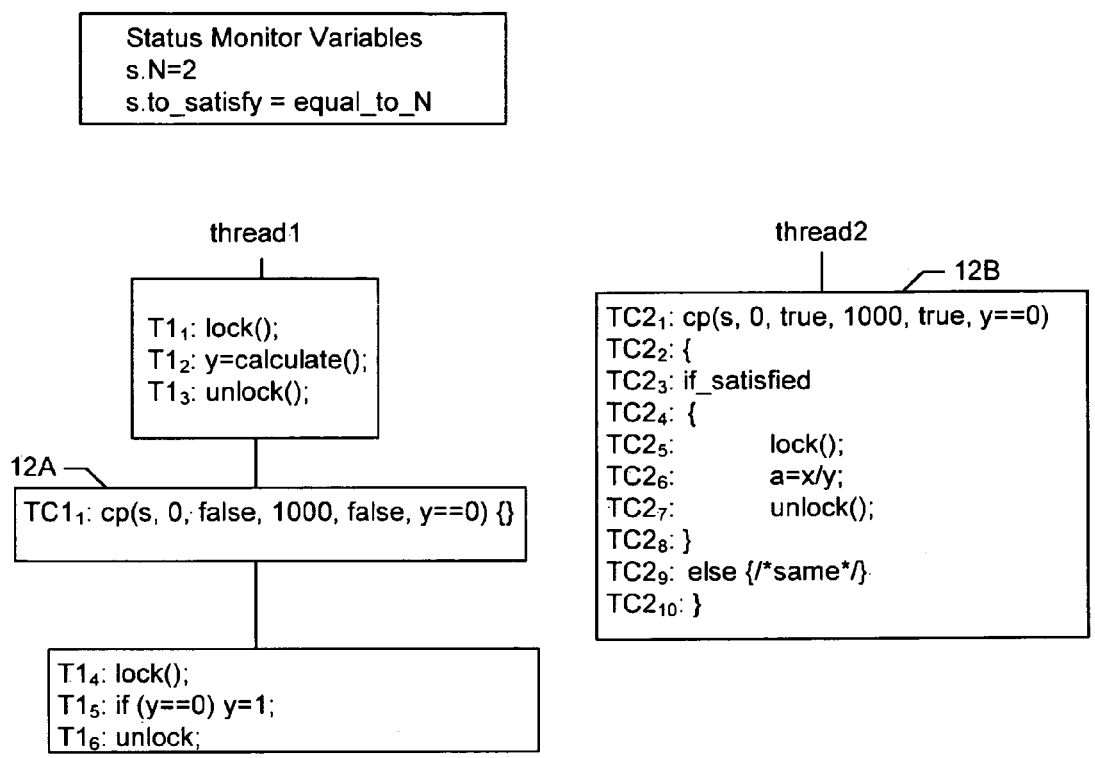
FIG. 6 illustrates example operations, represented in pseudo code, of the example first and second thread controllers of FIG. 3 configured to control the operations of the first and second threads of FIG. 2.

FIG. 6 illustrates an example implementation of the first and second thread controllers 12A and 12B of FIG. 3 in pseudo code. The first and second thread controllers 12A, 12B of the example of FIG. 6 control thread1 and thread2 of FIG. 2, respectively.

In this example, the variables N and to_satisfy of the status monitor 302 have been set to "2" and "equal to," respectively, such that the output of the status monitor 302, verify(state), will return true when S is equal to 2 (e.g., the number of concurrent predicates is 2).

When the second thread controller 12B begins to operate, the invoker processor 310B of the illustrated example sets the state, priority$_B$, control$_B$, sleep$_B$, sleepIfFalse$_B$ and predicate$_B$ parameters to the values reflected in line TC2$_1$. In this example, the state parameter is s, which includes state information regarding the number of predicates to be concurrently satisfied, N, and an associated conditional operator, to_satisfy. In this example, the number of predicates to be concurrently satisfied is represented as, s.N, and the associated conditional operator is represented as s.to_satisfy. The priority$_B$ parameter is set to 0 or false, the control$_B$ parameter is set to one or true, the sleep$_B$ parameter is set to 1000, the sleepIfFalse$_B$ parameter is set to one or true and the predicate$_B$ parameter is set to "y is equal to zero."

After the invoker processor 310B of the illustrated example operates, the pre-operations processor 320B operates. In this example, no pre-operations are indicated by line TC2$_2$, and, thus, no operations are performed. The second thread controller 12B then sleeps, (e.g., stalls) for up to 1000 milliseconds until the conditions required for the conditional operations processor 330B are met or the sleep timer 28B expires. In order for the conditional operations processor 330B of the illustrated example to perform the satisfied operations 332B, the predicate$_B$ parameter, (e.g., y is equal to zero), verify (state) and the control$_B$ parameter must all be true before 1000 ms have elapsed. As described above, the invoker processor 310B of the illustrated example pre-defined the control$_B$ parameter to be true, so the second thread controller 12B is stalled until the predicate$_B$ parameter, y is equal to zero, is true and verify(state) is true.

At the same time, thread1 obtains the lock on the variable y, calculates the value of y and releases the lock on the variable y. The first thread controller 12A of the illustrated example then begins to operate and the invoker processor 310A sets the state, priority$_A$, control$_A$, sleep$_A$, sleepIfFalse$_A$ and predicate$_A$ parameters. In this example, the state parameter is s, which includes state information regarding the number of predicates to be concurrently satisfied, N, and an associated conditional operator, to_satisfy. In this example, the number of predicates to be concurrently satisfied is represented as, s.N, and the associated conditional operator is represented as s.to_satisfy. The priority$_A$ parameter is set to false, the control$_A$ parameter is set to false, the sleep$_A$ parameter is set to 1000 ms, the sleepIfFalse$_A$ parameter is set to false and the predicate$_A$ parameter is set to "y is equal to zero."

After the invoker processor 310A of the illustrated example operates, the pre-operations processor 320A operates. In this example, no pre-operations are specified as indicated by line TC1$_1$ of FIG. 6 such that no operations are performed by the pre-operations processor 320A. The first thread controller 12A of the illustrated example then determines if the conditions required for the conditional operations processor 330A to perform the satisfied operations 332A are met. Again, the predicate$_A$ parameter, (i.e., y is equal to zero), verify(state) and the control$_A$ parameter must all be true. In this example, the control$_A$ parameter is set to false such that the satisfied operations 332A will never be performed. In addition, as described above in connection with FIG. 4, because the sleepIfFalse$_A$ parameter is set to false, then assuming the predicate$_A$ parameter is also false, the first thread controller 12A will perform the not satisfied operations 334A, the post operations processor 340A will operate and control of thread1 will be released. In this example, the not satisfied operations 334A and the post operations are no-ops (i.e., no operations) as indicated by the absence of such instructions in line TC1$_1$ so that no operations are performed and the first thread controller 12A releases control of thread1 and release control of thread1.

If the predicate$_A$ parameter is determined to be true, the predicate$_A$ and predicate$_B$ parameters are both true. As a result, the threshold number of concurrent predicates, S=2, is satisfied and verify(state) returns true. Despite the fact that the predicate$_A$ parameter and verify(state) both return true, the conditional operations processor 330A of the illustrated example will not perform the satisfied operations 332A because the control$_A$ parameter is set to false. However, because the predicate$_A$ parameter is true, the first thread controller 12A of the illustrated example will sleep for up to 1000 ms or until a crash occurs. In this example, y is equal to zero is the condition required for the concurrency violation so when the predicate$_A$ parameter is true, the computer will crash as described below.

As described above, when y is equal to zero, the predicate$_B$ parameter is true, and the conditional operations processor 330B of the illustrated example performs the satisfied operations 332B because the control$_B$ parameter and verify(state) are also true. In this example, the satisfied operations 332B performed by the conditional operations processor 330B include 1) a lock operation, 2) a divide operation, and 3) an unlock operation as indicated by lines TC2$_3$-TC2$_7$ of FIG. 6. Because the divisor used in the divide operation equals zero, (e.g., "y is equal to zero"), the concurrency violation occurs in the form of a divide by zero exception and the multi-threaded program 11 crashes. Thus, the bug is reproduced and the portions of the multi-threaded program 11 that caused the bug to occur have been isolated.

If the predicate$_B$ parameter is not met before 1000 ms, the conditional operations processor 330B of the illustrated example will perform the not satisfied operations 334B after which and the post operations processor 340B will operate. In this example, the not satisfied operations 334B are the same as the satisfied operations 332B as reflected by line TC2$_9$ of FIG. 6 except that during this iteration y is a non-zero value so that the division operation does not cause the multi-threaded program 11 to crash. The post operations is an empty sequence, (e.g., a no-op) as reflected by the absence of instructions between lines TC2$_9$ and TC2$_{10}$ so that the post operations processor 340B does not perform any operations and the second thread controller 12B releases control of thread2.

If the multi-threaded program 11 does not crash and the operations represented by lines TC2$_3$-TC$_8$ were executed, (e.g., the conditions required for the concurrency violation did not occur), then the programmer is assured that the concurrency violation is not a result of a divide by zero exception associated with these portions of thread1 and thread2. The programmer may then configure a new set of thread controllers to control other portions (not shown) of thread1 and thread2 that may be causing the concurrency violation. Or, if the programmer is using the first and second thread controllers 12A, 12B after the threads have been revised in response to a program crash, then the programmer gains confidence that the repair of the defective code was successful.

When describing the operation of the first thread controller 12A and the second thread controller 12B of FIG. 6, the values of the priority$_A$ and priority$_B$ parameters are not taken into consideration because the values are the same. As a result, in this example, neither of the first and second thread controllers 12A, 12B has priority over the other such that the first and second thread controllers 12A, 12B may execute in any order relative to each other.

Referring again to FIG. 4, the operations performed by the, the pre-operations processors 320A, 320B, and the conditional operations processors 330A, 330B of FIG. 3 are serialized compound operations and are, therefore, performed without any interleaving operations. As a result, when the pre-operations processor of a given thread controller is operating, the pre-operations processor(s) and the conditional operations processor(s) of other thread controller(s) are not permitted to operate. Likewise, when the conditional operations processor of a given thread controller is operating, the pre-operations processor and the conditional operations processor(s) of other thread controller(s) are not permitted to operate. In this way, specific types of operations performed by some of the processors of the various thread controllers are serialized relative to each other to prevent the occurrence of any undesired interleaving operations that may adversely affect the operation of the multi-thread controller 10.

While examples of the multi-thread controller 10 and the first thread controller and second thread controllers 12A, 12B have been illustrated in FIGS. 1, 3, 4, 5 and 6, one or more of the elements, processes and/or devices illustrated in FIGS. 1, 3, 4, 5 and 6 may be combined, divided, re-arranged, omitted, eliminated and/or implemented in any other way. Further, any or all of the example thread controllers 12A, 12B, 10, the example control logic processors 24A, 24B, the example condition testers 26A, 26B, 304, the example memories 30A, 30B, 306, the example invoker processors 310A, 310B, the example pre-operations processors 320A, 320B, the example conditional operations processors 330A, 330B, the example post-operations processors 340A, 340B, the example timers 28A, 28B, and the example status monitor 302 of FIGS. 1, 3, 4, 5 and 6 may be implemented by hardware, software, firmware and/or any combination of hardware, software and/or firmware. Thus, for example, any of the example thread controllers 12A, 12B, 10, the example control logic processors 24A, 24B, the example condition testers 26A, 26B, 304, the example memories 30A, 30B, 306, the example invoker processors 310A, 310B, the example pre-operations processors 320A, 320B, the example conditional operations processors 330A, 330B, the example post-operations processors 340A, 340B, the example timers 28A, 28B, and the example status monitor 302 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of the example thread controllers 12A, 12B, 10, the example control logic processors 24A, 24B, the example condition testers 26A, 26B, 304, the example memories 30A, 30B, 306, the example invoker processors 310A, 310B, the example pre-operations processors 320A, 320B, the example conditional operations processors 330A, 330B, the example post-operations processors 340A, 340B, the example timers 28A, 28B, and the example status monitor 302 are hereby expressly defined to include a tangible computer readable medium such as a memory, digital versatile disk (DVD), compact disk (CD), etc., storing such software and/or firmware. Further still, the example thread controller 10 of FIGS. 1, 3, 4, 5 and 6 may include one or more elements, processes and/or devices in addition to, or instead of, those illustrated in FIGS. 1, 3, 4, 5 and 6 and/or may include more than one of any or all of the illustrated elements, processes and devices.

Flowcharts representative of example machine readable instructions that may be executed to implement the first and/or second thread controllers of FIGS. 1, 3, 4, 5, and 6 are shown in FIGS. 7, 8, 9 and 10. In these examples, the machine readable instructions represented by each flowchart may comprise one or more programs for execution by a processor, such as the processor 1512 shown in the example processing system 1500 discussed below in connection with FIG. 15. Alternatively, the entire program or programs and/or portions thereof implementing one or more of the processes represented by the flowcharts of FIGS. 7, 8, 9 and 10 could be executed by a device other than the processor 1512 (e.g., such as a controller and/or any other suitable device) and/or embodied in firmware or dedicated hardware (e.g., implemented by an ASIC, a PLD, an FPLD, discrete logic, etc.).

Also, one or more of the blocks of the flowcharts of FIGS. 7, 8, 9 and 10 may be implemented manually. Further, although the example machine readable instructions are described with reference to the flowcharts illustrated in FIGS. 7, 8, 9 and 10 many other techniques for implementing the example methods and apparatus described herein may alternatively be used. For example, with reference to the flowcharts illustrated in FIGS. 7, 8, 9 and 10, the order of execution of the blocks may be changed, and/or some of the blocks described may be changed, eliminated, combined and/or subdivided into multiple blocks.

As mentioned above, the example processes of FIGS. 7, 8, 9 and 10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7, 8, 9 and 10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 7:
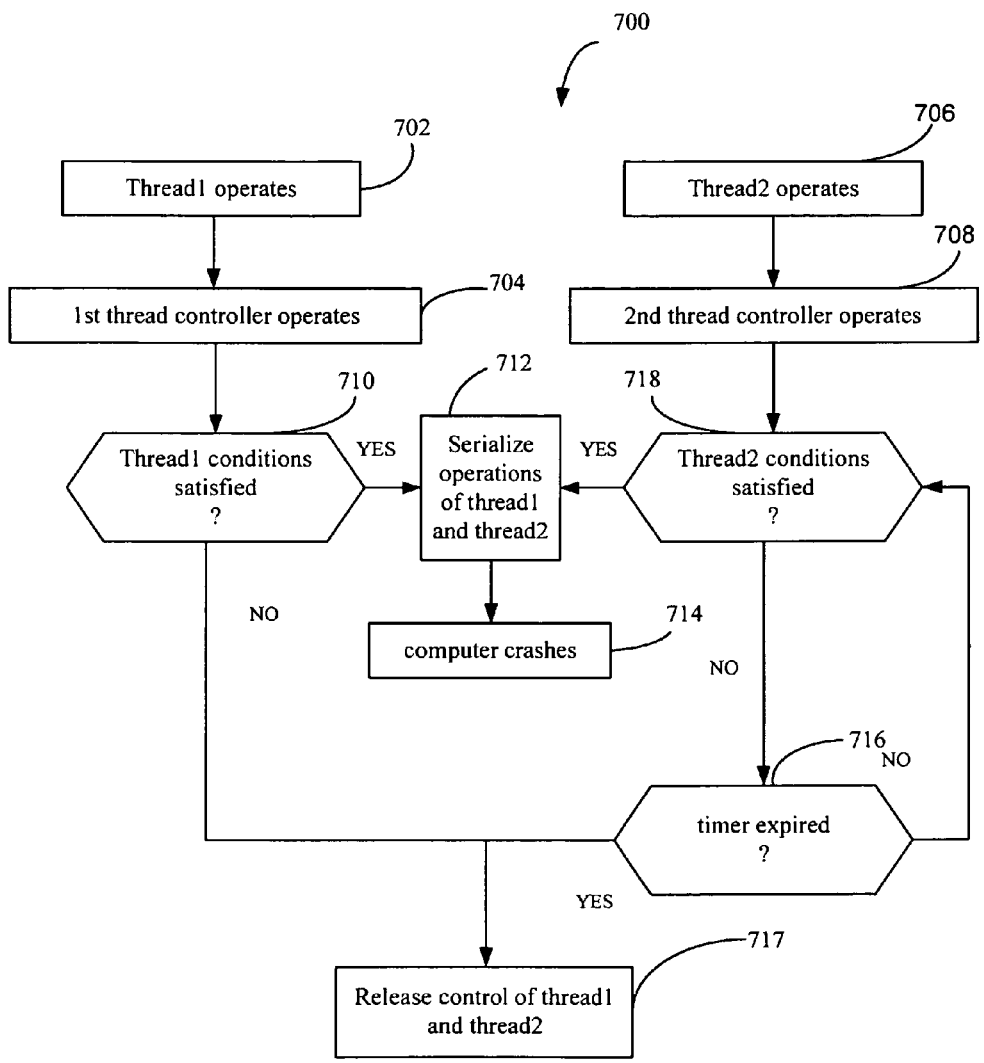
FIG. 7 is a flowchart representative of example machine readable instructions that may be executed to implement the multi-thread controller of FIG. 1 for use in causing the first thread and the second thread to reproduce a concurrency violation caused by a divide by zero exception.

Example machine readable instructions 700 that may be executed to implement the first and/or second thread controllers 12A and 12B of FIG. 1 are represented by the flowchart shown in FIG. 7. The example machine readable instructions 700 may be executed at intervals (e.g., predetermined intervals), based on an occurrence of an event (e.g., a predetermined event), etc., or any combination thereof. The machine readable instructions 700 begin execution at a block 702 of FIG. 7 at which a first thread, thread1, begins to operate until a specific point in thread1 is reached at which point the first thread controller 12A begins to operate at a block 704. Simultaneously, a second thread, thread2, begins to operate at a block 706 until a specific point in thread2 is reached at a block 708 at which point the second thread controller 12B begins to operate.

Once the first thread controller 12A begins operating at the block 704, flow proceeds to a block 710 at which the condition tester 26A determines whether one or more of a set of conditions have been satisfied. If the conditions have been satisfied, control proceeds to a block 712 at which the first and second thread controllers serialize one or more of the operations of thread1 and thread2 relative to one another. Control then proceeds to a block 714 at which the multi-threaded program 11 crashes. If the conditions are not met at the block 710, the first thread controller 12A releases control of thread1 at a block 717.

Once the second thread controller 12B begins operating at the block 708, flow proceeds to a block 718 at which the condition tester 26B determines whether one or more of a set of conditions have been satisfied. If one or more of the conditions have been satisfied, then control proceeds to the block 712 at which the first and second thread controllers 12A, 12B serialize one or more of the operations of thread1 and thread2 relative to one another. Control then proceeds to the block 714 at which the multi-threaded 11 program crashes. If one or more of the conditions are not met at the block 718 and the timer 28B has not yet expired at the block 716, the condition tester 26B continues to test for the conditions to be met at the block 718. If one or more of the conditions are not met and the timer has expired at the block 716, the second thread controller 12B releases control of thread2 at the block 717. As can be seen with respect to FIG. 7, when the conditions are satisfied, the first and second thread controllers 12A, 12B coordinate to serialize the operations of thread1 relative to thread2 to thereby force a concurrency violation to occur and the computer to crash.

Figure 8:
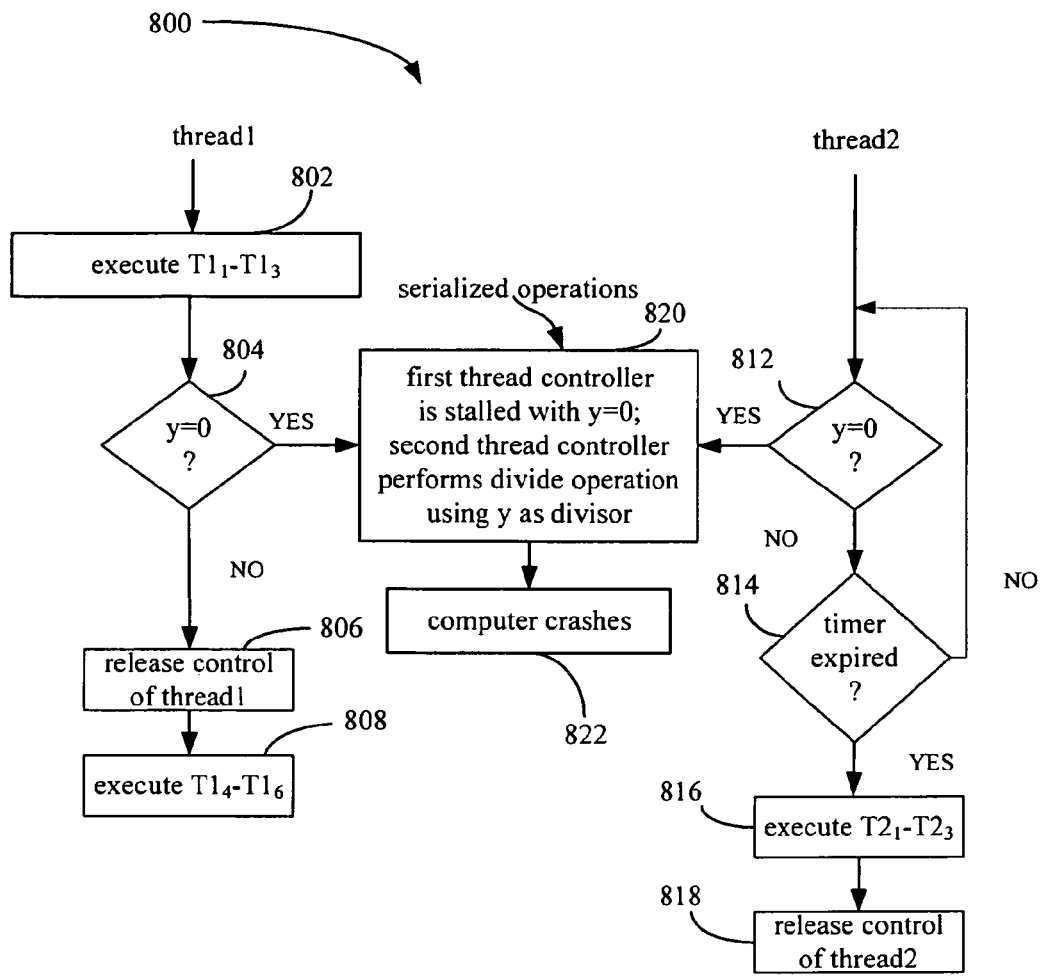
FIG. 8 is a flowchart representative of example machine readable instructions that may be executed to implement the multi-thread controller of FIG. 3 for use in causing the first thread and the second thread of FIG. 2 to reproduce a concurrency violation caused by a divide by zero exception.

Example machine readable instructions 800 that may be executed to implement the first and/or second thread controllers 12A and 12B of FIG. 1 to control a multi-threaded program 11 that operates according to the pseudo code of FIG. 2 are represented by the flowchart shown in FIG. 8. The example machine readable instructions 800 may be executed at intervals (e.g., predetermined intervals), based on an occurrence of an event (e.g., a predetermined event), etc., or any combination thereof. The machine readable instructions 800 begin execution at a block 802 of FIG. 8 at which a first thread, thread1, begins to operate. At the block 802, the thread1 performs the operations of $T1_1$-$T1_3$ of FIG. 2 which include 1) obtaining a lock, 2) calculating a value of y, and 3) releasing the lock. Next, at a block 804, the first thread controller 12A begins to operate and the condition tester 26A tests for the condition y equal zero. If the condition has not been met, at a block 806, the first thread controller 12A releases control of thread 1. The operations represented by lines $T1_4$-$T1_6$ of FIG. 2 in which 1) the lock is obtained, 2) y is set to one, if y equal zero, and 3) the lock is released are performed at a block 808. The second thread controller 12B begins to execute at a block 812 and the condition tester 26B tests for the condition y equal zero. If the condition is not met, the forward progress of the second thread controller 12B and, thus, thread2, stalls until either a timer 28B expires at a block 814 or the condition y equal zero is met. If the condition y is equal to zero is not met and the timer 28B has expired at the block 814, then control logic processor 24B executes lines $T2_1$-$T2_3$ of thread2 at a block 816 to 1) obtain the lock on the variable y, 2) perform a divide operation using y as the divisor, and 3) release the lock on y. In this iteration, y is a non-zero value such that the divide operation does not cause the multi-threaded program 11 to crash. After the lock is released, the second thread controller releases control of thread2 at a block 818.

If, at the block 804, the condition tester 26A determines that the condition y is equal to zero is met, the condition tester 26B also determines that the condition y is equal to zero is met at the block 812. As a result, the operation of the second thread controller 12B becomes unstalled and the control logic processor 24B executes lines $T2_1$-$T2_3$ at a block 820 to 1) obtain the lock on the variable y, 2) perform a divide operation using y as a divisor; and 3) release the lock on y. Because the divisor, y, is zero, the multi-threaded program 11 experiences a concurrency violation and the computer program crashes at a block 822 before the lock is released.

Figure 9:
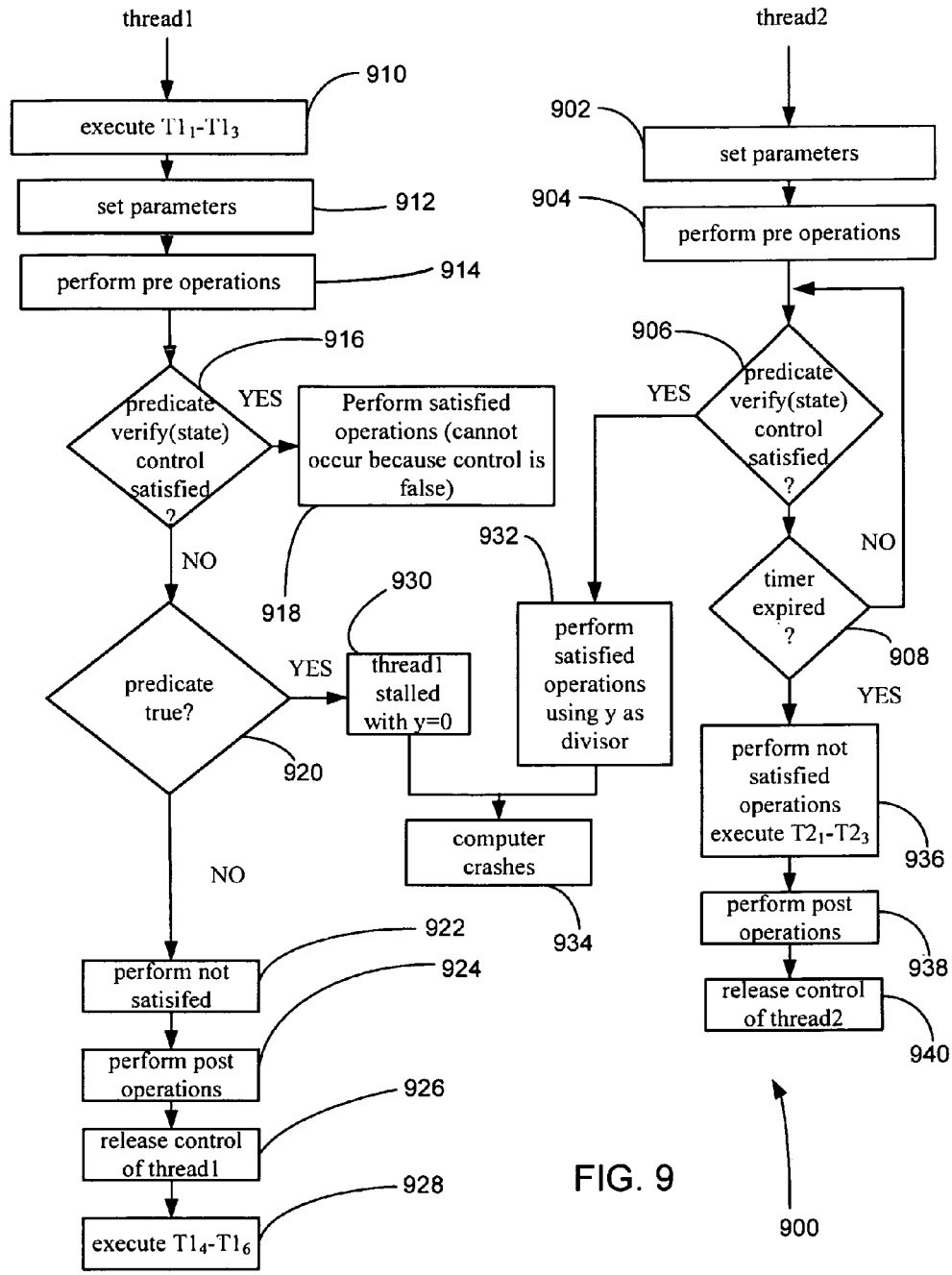
FIG. 9 is a flowchart representative of example machine readable instructions that may be executed to implement the multi-thread controller of FIG. 6 for use in causing the first thread and the second thread of FIG. 2 to reproduce a concurrency violation caused by a divide by zero exception.

Example machine readable instructions 900 that may be executed to implement the first and second thread controllers 12A, 12B of FIGS. 3, 4 and 5 to control a multi-threaded program 11 that operates according to the pseudo code of FIG. 2 are represented by the flowcharts shown in FIG. 9. In this example, the first and second thread controllers 12A, 12B operate to control thread1 and thread2, respectively, according to the control structures defined in FIG. 6. The example machine readable instructions 900 may be executed at intervals (e.g., predetermined intervals), based on an occurrence of an event (e.g., a predetermined event), etc., or any combination thereof. In this example, the variables N, and to_satisfy are set to "2" and to "equal to" and the variable set "satisfied" is defined to contain no threadIDs. Thus, in this example, the output of the status monitor 302 will return true only when the number of active threads having a concurrent predicate, S, is equal to 2.

The machine readable instructions 900 begin execution at a block 902 at which the second thread controller 12B begins to operate. Specifically, at the block 902, the control structure of the second thread controller is invoked and the invoker processor 310B sets the state, $priority_B$, $control_B$, $sleep_B$, $sleepIfFalse_B$ and $predicate_B$ parameters. In this example, the state parameter has state.N set to "2" and state.to_satisfy set to "equal_to", the $priority_B$ parameter is set to 0, the $control_B$ parameter is set to true, the $sleep_B$ parameter is set to 1000, the $sleepIfFalse_B$ parameter is set to true and the $predicate_B$ parameter is set to the condition y is equal to zero.

After the second thread controller 12B is invoked, the pre operations processor 320B performs a set of pre-processing operations, if any are specified by the control structure, at a block 904. In this example, pre processing operations are not specified in the control structure such that no operations are performed. The condition tester 26B then tests to determine whether the conditions required for performing the satisfied operations 332B are met at a block 906. In this case, the $predicate_B$ parameter y=0 must be true, the output of the status monitor 302 must be true and the $control_B$ parameter must be true before the satisfied operations 332B will be performed. At the block 902, the invoker processor 310B pre-defined the $control_B$ parameter to be true, so the satisfied operations 332B will be performed if the $predicate_B$ parameter y is equal to zero and the output of the status monitor 302 both become true. If the relevant conditions are not met, as described in connection with FIG. 4, the second thread controller 12B will permit additional time for the conditions to be met provided that the $predicate_B$ parameter is false and the $sleepifFalse_B$ parameter is true. In this example, the $predicate_B$ parameter is false and the $sleepifFalse_B$ parameter is true, such that additional time (in this example 1000 ms) is allotted. The condition tester 26B determines whether the 1000 ms have elapsed as measured by the timer 28B at a block 908. If the timer 28B has not expired at the block 908, control returns to the block 906. In this manner, the forward progress of thread2 stalls for up to 1000 milliseconds at the blocks 906 and 908 until the condition tester 26B determines that either the conditions required for the conditional operations processor 330B to perform the satisfied operations 332B have been met at the block 906 or until the timer 28B has expired at the block 908.

At a block 910, thread1 executes to 1) obtain the lock on the variable y, 2) calculate the value of y and 3) release the lock on the variable y. The first thread controller 12A then begins to operate when the invoker processor 310A sets the state, $priority_A$, $control_A$, $sleep_A$, $sleepIfFalse_A$ and $predicate_A$ parameters at a block 912. Here, the state parameter has state.N set to "2" and state.to_satisfy set to "equal_to", the $priority_A$ parameter is set to 0, the $control_A$ parameter is set to false, the $sleep_A$ parameter is set to 1000, the $sleepIfFalse_A$ parameter is set to false and the $predicate_A$ parameter is set to y is equal to zero.

After the first thread controller 12A is invoked, the pre-operations processor 320A performs a set or sequence of pre-processing operations at a block 914, if any are specified by the control structure. In this example, no pre-processing operations are specified, such that none are performed. The condition tester 26A determines whether the conditions required for the conditional operations processor 330A to perform the satisfied operations 332A have been met at a block 916. Specifically, the condition tester determines whether the $predicate_A$ parameter, verify(state) and the $control_A$ parameter are all true. Because the invoker processor 310A set the $control_A$ parameter to false at the block 912, the satisfied operations 332A will never be performed as indicated at a block 918. At a block 920, the condition tester determines whether the $predicate_A$ parameter has been met. If the $predicate_A$ parameter is false, (i.e., y is not equal to zero), the first thread controller 12A will perform the not satisfied operations 334A at a block 922 and the post operations processor 340A will execute at a block 924 before releasing control of thread1 at a block 926. As described above in connection with FIG. 4, if the condition tester 26A determines at the block 920 that the $predicate_A$ parameter is false, the first thread controller 12A will permit additional time for the conditions required for execution of the satisfied operations to be met unless the $sleepIfFalse_A$ parameter is false. In this example, the $sleepIfFalse_A$ parameter is set to false in the control structure of FIG. 6 such that additional time is not permitted and the conditional operations processor 330A executes the not satisfied operations 334A. The control structure of the second thread controller 12A of FIG. 6 does not specify any not satisfied operations 332A or post operations such that no actions are performed at the blocks 922 and 924 in this example. At a block 926, the thread1 operations indicated by lines $T1_4$-$T1_6$ of FIG. 6 are performed. If, at the block 920, the condition tester 26A determines that the $predicate_A$ parameter y is equal to zero is true, and the first thread controller 12A permits additional time, in this example 1000 ms, for the satisfied conditions to be met then thread1 will stall until the timer expires or the $predicate_A$ parameter becomes false. Because the $control_A$ parameter is set to false, the satisfied conditions will never be met such that the first thread controller 12A stalls for 1000s ms or until the computer program crashes.

Referring again to the operation of the second thread controller 12B, when the $predicate_A$ parameter is true, the $predicate_B$ parameter y=0 is also true and verify(state) returns true. At this time, all of the parameters tested at the block 906 are met and the conditional operations processor 330B performs the satisfied operations 332B at a block 932. The satisfied operations 332B performed by the conditional operations processor 330B at the block 932 include 1) obtaining the lock ($TC2_5$), 2) performing a divide operation using y as the divisor ($TC2_6$); and 3) releasing the lock ($TC2_7$). Because the divisor used in the divide operation equals zero, i.e., y=0, a concurrency violation occurs in the form of a divide by zero exception and the multi-threaded computer program 11 crashes at a block 934. Thus, the bug is reproduced and the portions of the multi-threaded program 11 that cause the bug to occur have been isolated.

If the $predicate_B$ parameter y=0 does not become true before 1000 ms have elapsed as determined at the block 908, the conditional operations processor 330B will perform the not satisfied operations 334B at a block 936 and the post operations processor 330B will operate at a block 938. In this example, the not satisfied operations 334B are the same as the satisfied operations 332B except that during this execution y does not equal zero and the divide operation does not cause the computer program 11 to crash. The post operations is an empty sequence (e.g., a no-op) such that the post operations processor 340B does not perform any operations at the block 938 and the second thread controller 12B releases control of thread2 at a block 9404.

When describing the operation of the first thread controller 12A and the second thread controller 12B of FIG. 9, the values of the $priority_A$ and $priority_B$ parameters are not taken into consideration because the values are the same. As a result, in this example, neither of the first and second thread controllers 12A, 12B has priority over the other such that the first and second thread controllers 12A, 12B may execute in any order relative to each other.

The pre, if satisfied, else and post compound statements of FIG. 4 can be implemented using alternative techniques such as lambda expressions, anonymous functions, or C-preprocessor macros instead of using programming language keywords as shown above.

Figure 10:
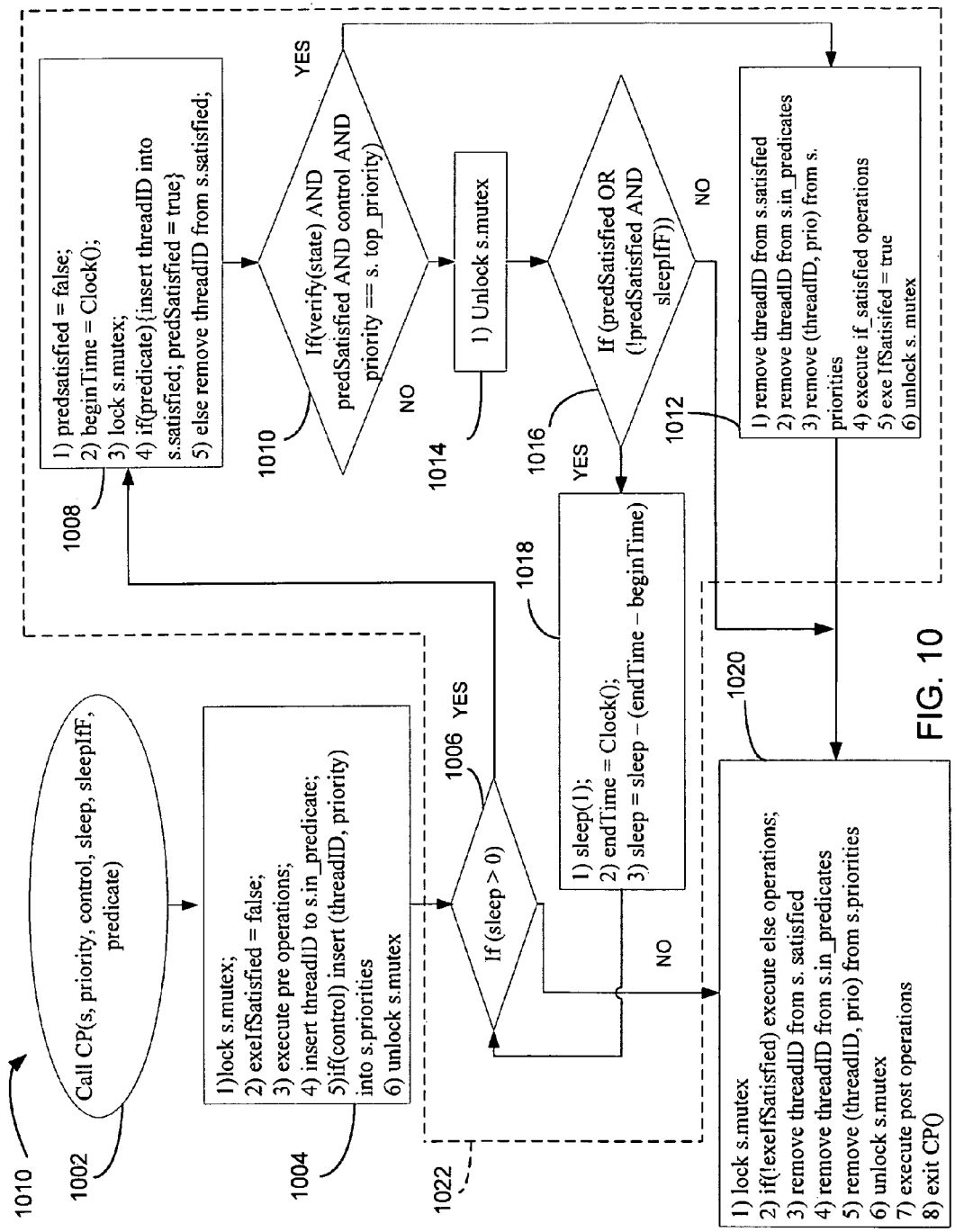
FIG. 10 is a flowchart representative of example machine readable instructions that may be executed to implement the example control structure of FIG. 4.

Example machine readable instructions 1000 that may be executed to implement the operation of either of the first or the second thread controllers 12A, 12B as reflected in FIG. 4 are represented by the flowchart shown in FIG. 10. Although the example machine readable instructions may be used to implement either of the first or second thread controllers 12A, 12B, for illustrative purposes, the blocks of the flowchart of FIG. 10 are described with reference to the first thread controller 12A. The example machine readable instructions 1000 may be executed at intervals (e.g., predetermined intervals), based on an occurrence of an event (e.g., a predetermined event), etc., or any combination thereof. Before the thread controller 12A begins to operate, the variables N, to_satisfy and satisfied of the status monitor 302 are set to obtain the required number of predicates upon which verify(state) will return true.

At a block 1002, the invoker processor 310A sets the parameters of the control structure, state, $priority_A$, $control_A$, $sleep_A$, $sleepIfFalse_A$ and $predicate_A$. At a block 1004, a number of operations are performed to set a variety of variables needed to ensure proper operation of the first thread controller 12A. In some examples, the operations include: 1) locking the shared variable, state, to prevent access by other thread controllers, 2) setting a variable exeIfSatisfied to false to indicate that the satisfied operations 332A have not been performed, 3) performing the pre operations, 4) inserting the threadID of the current thread into the set of variables called s.in_predicate to indicate that the current thread is active, 5) inserting the threadID and the $priority_A$ parameter of the current thread into the variable set called s.priorities, if the $control_A$ parameter is set to true, and 6) releasing the lock on the shared variable, state. The threadID's stored in the set called s.priorities will later be used to determine whether the currently active thread has the highest priority of all threads actively being controlled. The second, third, fourth and fifth operations performed at the block 1004 are used to affect the flow of operations performed by the thread controller as described below.

At a block 1006, the condition tester 26A determines if the timer 28A has expired by evaluating whether the $sleep_A$ parameter is greater than zero. If the $sleep_A$ parameter is greater than zero, a set of operations are performed at a block 1008 including 1) setting a variable predsatisifed to false to indicate that the $predicate_A$ parameter of the current thread has not yet been satisfied; 2) setting a variable, beginTime, equal to the value of a Clock( ) 3) locking the shared variable, state, to prevent access by other thread controllers; 4) inserting the threadID of the current thread into the variable set s.satisfied, and setting the variable predSatisfied to true, provided that the predicate$_A$ parameter is true, and 5) removing the threadID of the current thread from the variable s.satisfied if the predicate$_A$ parameter is not true. When the threadID of the current thread is inserted into s.satisfied as reflected by the fourth operation performed at the block 1008, the variable S used by the status monitor is incremented. As discussed above, the variable S reflects the number of active concurrent predicates for all of the currently active threads. Likewise, if threadID is removed from s.satisified, the S variable is decremented to indicate that one fewer thread has an active concurrent predicate. The first, second, fourth and fifth operations performed at the block 1008 are used to affect the flow of operations performed by the first thread controller 12A as described below At a block 1010, the condition tester 26A determines whether the conditions required for a concurrency violation have been met. Specifically, the condition tester 26A determines if verify(state), predSatisfied, control$_A$ and priority$_A$=s.top_priority are all true. In this example, s.top_priority, is equal to the highest priority parameter of all currently active threads having a control variable with a value of true. By determining if the priority$_A$ parameter of the current thread is equal to s.top_priority, the first thread controller 12A is evaluating whether the thread1 has a higher priority than all other active threads. If the priority$_A$ parameter of thread1 is higher than or equal to the priority parameter associated with all other active threads, the satisfied operations 332A will be performed at a block 1012 as described below. In this way, the order in which the satisfied operations of the active thread controllers are performed is coordinated.

Provided that the condition tester 26A determines that the conditions required for a concurrency violation are met at the block 1010, control proceeds to the block 1012. At the block 1012 a set of operations are performed including: 1) removing threadID from s.satisfied; 2) removing threadID from s.in_predicates; 3) removing threadID and the priority parameter of the current thread from the variable set, s.priorities; 4) performing the satisfied operations; 5) setting the variable exeIfSatisfied to true to indicate that the satisfied operations have been performed; and, 6) releasing the lock on the shared variable state. The first, second and third operations performed at the block 1012 involve resetting the variables s.satisfied, s.in_predicates, and s.priorities in anticipation of the next execution of the blocks included in FIG. 10. After the block 1012, control proceeds to a block 1020 at which a set of operations are performed as described below.

If at the block 1010, the conditions required for a concurrency violation are not met, the shared mutex of state is unlocked at a block 1014. At a block 1016, the condition tester 26A determines if either 1) predSatisfied is true or if 2) predSatisfied is false and sleepifFalse$_A$ are true. The test performed at the block 1016 is used to determine whether the first thread controller 12A will continue to allow additional time for the conditions required for a concurrency violation to be met. If the condition tester 26A determines at the block 1016 that the conditions are not met, the first thread controller 12A will not wait any longer for the conditions required for a concurrency violation and will execute the operations reflected by the block 1020 as described below. If condition tester 26A determines at the block 1016 that the conditions are met, the first thread controller 12A will wait an additional amount of time for the conditions required for a concurrency violation to be met and the value of the sleep$_A$ parameter will be calculated at a block 1018. At the block 1018, a set of operations are performed including: 1) calling the sleep( ) function with a parameter of 1, to force the thread being controlled to sleep for 1 ms thereby allowing other threads to make forward progress, 2) setting a variable endTime equal to Clock( ), and 3) setting the sleep$_A$ parameter equal to sleep$_A$–(endTime–beginTime). At the block 1006, the condition tester 26A again determines whether the sleep$_A$ parameter is greater than zero as described above. The execution of the blocks 1006 through 1018 may be implemented as a while loop represented by the block 1022.

If at the block 1006, the condition tester 26A determines that the sleep$_A$ parameter is not greater than zero, a set of operations are performed at the block 1020 including 1) locking the mutex of the shared variable, state; 2) performing the not satisfied operations provided that the variable exeIfSatisifed is false; 3) removing the threadID of the current thread from the variable set s.satisfied; 4) removing the threadID of the current thread from the variable set s.in_predicates; 5) removing the threadID and the priority parameter of the current thread from the variable set s.priorities; 6) releasing the lock of the shared variable state; 7) performing the post operations; and, 8) exiting the control structure, (i.e., releasing control of the thread). As described with respect to block 1012, the operations at the block 1020 that involve resetting the variables s.satisfied, s.in_predicates, and s.priorities are performed in anticipation of the next execution of the blocks included in FIG. 10. If at the block 1020, the condition tester 26A determines that the variable exeIfSatisfied is true during the second operation, the not satisfied operations 334A are not performed.

FIG. 11 illustrates pseudo code that represents an example manner of implementing the thread controller of FIG. 4. The general flow of the operations performed by the pseudo code statements of FIG. 11 is reflected by the flow chart of FIG. 10. In this example, the operations of the block 1002 correspond to the first statement of FIG. 11. The operations of the block 1004 correspond to the statements 2 through 9 of FIG. 11. The operation of the block 1006 corresponds to the statement 10. The operations of the blocks 1008, 1010, and 1012 correspond to the statements 11-30. The operation of the block 1014 corresponds to the statement 31. The operations of the block 1016 correspond to the statements 32-34. The operations of the block 1012 correspond to the statements 35-38. The operations of the block 1020 correspond to the statements 39-43. As described above, the blocks of FIG. 10 are intended to reflect the general flow of the operations performed by the pseudo code statements of FIG. 11. As a result, there is not a one to one correspondence between the blocks of FIG. 10 and the pseudo code statements of FIG. 11. It is noted that some of the example operations of some of the example blocks of FIG. 10 are not defined to be part of the control structure represented by the pseudo code of FIG. 4. Some such example operations include lines 3), 4) and 5) of block 1020 and lines 1), 2) and 3) of block 1012. Such example operations are performed by the thread controller(s) to, for example, reset system variables and permit proper operation of the thread controller during later iterations of the blocks of FIG. 10.

Although, for illustrative purposes, in the examples of FIGS. 6, 7, 8 and/or 9, the first thread controller 12A is described as beginning to operate before the second thread controller of 12B, or vice versa, or the first and second thread controllers 12A and 12B are described as beginning to operate simultaneously, either of the first and second thread controllers 12A and 12B can begin to operate before the other.

Figure 12:
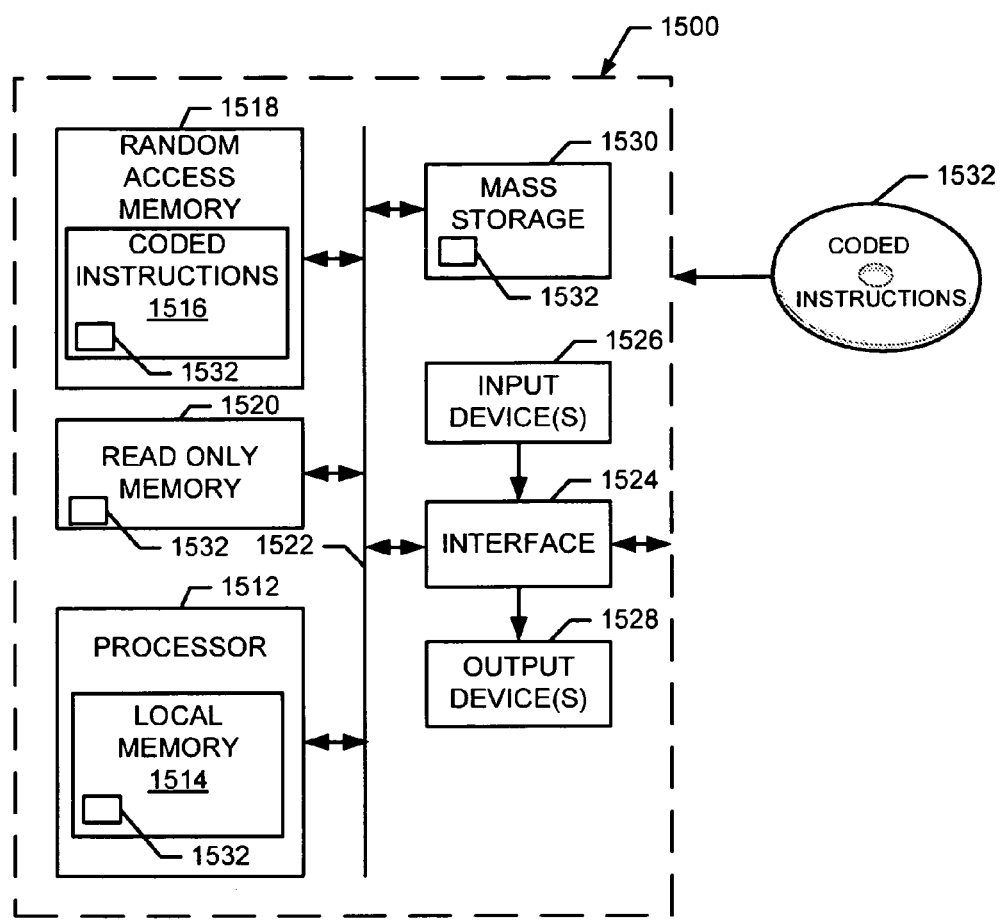
FIG. 12 is a block diagram of an example processing system that may execute the example machine readable instructions of FIGS. 7, 8, 9, 10 and/or 11 to implement the example multi thread controllers of FIGS. 1, 3, 4, 5, and/or 6.

FIG. 12 is a block diagram of an example processing system 1500 capable of implementing example apparatus and methods disclosed herein. The processing system 1500 can be, for example, a server, a personal computer, a personal digital assistant (PDA), cell phone, an Internet appliance, or any other type of computing device.

The system 1500 of the instant example includes a processor 1512 such as a general purpose programmable processor. The processor 1512 includes a local memory 1514, and executes coded instructions 1516 present in the local memory 1514 and/or in another memory device. The processor 1512 may execute, among other things, the machine readable instructions represented in FIGS. 7-11. The processor 1512 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families and/or manufacturers are also appropriate.

The processor 1512 is in communication with a main memory including a volatile memory 1518 and a non-volatile memory 1520 via a bus 1522. The volatile memory 1518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1520 may be implemented by flash memory and/or any other desired type of memory device. Access to the main memory 1518, 1520 is typically controlled by a memory controller (not shown).

The processing system 1500 also includes an interface circuit 1524. The interface circuit 1524 may be implemented by any type of interface standard, such as an Ethernet interface, a universal serial bus (USB), and/or a PCI express interface.

One or more input devices 1526 are connected to the interface circuit 1524. The input device(s) 1526 permit a user to enter data and commands into the processor 1512. The input device(s) can be implemented by, for example, a keyboard, a mouse, a touchscreen, a track-pad, a trackball, an isopoint and/or a voice recognition system.

One or more output devices 1528 are also connected to the interface circuit 1524. The output devices 1528 can be implemented, for example, by display devices (e.g., a liquid crystal display, a cathode ray tube display (CRT)), by a printer and/or by speakers. The interface circuit 1524, thus, typically includes a graphics driver card.

The interface circuit 1524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1500 also includes one or more mass storage devices 1530 for storing machine readable instructions and data. Examples of such mass storage devices 1530 include floppy disk drives, hard drive disks, compact disk drives and digital versatile disk (DVD) drives. In some examples, the mass storage device 1530 may implement the memories 28A, 28B.

The coded instructions 1532 of FIGS. 7-11 may be stored in the mass storage device 1530, in the volatile memory 1518, in the non-volatile memory 1520, in the local memory 1514 and/or on a removable storage medium, such as a CD or DVD 1532.

As an alternative to implementing the methods and/or apparatus described herein in a system such as the processing system of FIG. 15, the methods and/or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the claims of the patent either literally or under the doctrine of equivalents.

What is claimed is:

1. A method to identify threads responsible for causing a concurrency violation in a multi-threaded program comprising:

executing, with a processor, a first thread controller inserted into a first thread of the multi-threaded program, the first thread controller defining a first condition;

executing, with the processor, a second thread controller inserted into a second thread of the multi-threaded program, the second thread controller defining a second condition;

determining whether at least one of the first condition or the second condition is met;

based on whether the at least one of the first condition or the second condition is met, serializing an operation of the first thread of the multi-threaded program relative to an operation of the second thread of the multi-threaded program, the serializing to force the concurrency violation to occur, wherein the serializing occurs when the first and second conditions are concurrently met; and based on the occurrence of the concurrency violation, identifying the first and second threads as being responsible for causing the concurrency violation.

2. A method as defined in claim 1, wherein the serializing includes:

controlling the forward progress of the first thread with the first thread controller; and controlling the forward progress of the second thread with the second thread controller.

3. A method as defined in claim 1, wherein the serializing includes halting the first thread when the first condition is met and permitting the second thread to advance until the second condition is met.

4. A method as defined in claim 1, wherein the serializing is further based on whether the first condition is met before the second condition is met.

5. A method as defined in claim 1, wherein the serializing is further based on whether the at least one of the first condition or the second condition is met a threshold number of times.

6. A tangible computer readable medium comprising computer readable instructions which, when executed, cause a computer to at least:

define a first condition inserted into a first thread;

define a second condition inserted into a second thread;

determine whether at least one of the first condition or the second condition has been met;

based on whether at least one of the first condition or the second condition is met, serialize an operation of the first thread relative to an operation of the second thread of a multi-threaded program to cause the concurrency violation to occur, wherein the serializing occurs when the first and second conditions are concurrently met; and based on the occurrence of the concurrency violation, identify the first thread and the second thread as being responsible for causing the concurrency violation.

7. A computer readable medium as defined in claim 6, wherein the computer readable instructions to serialize the operation of the first thread relative to the operation of the second thread cause the computer to control the forward progress of the first thread relative to the forward progress of the second thread.

8. A computer readable medium as defined in claim 7, wherein the computer readable instructions to serialize the operation of the first thread relative to the operation of the second thread cause the computer to:
    halt the forward progress of the first thread until the first condition has been met or until a first amount of time has elapsed; and,
    halt the forward progress of the second thread until the second condition has been met or until a second amount of time has elapsed.

9. A tangible computer readable medium as defined in claim 6, wherein the serializing is further based on whether the first condition and the second condition are met in a defined order.

10. A tangible computer readable medium as defined in claim 6, wherein the serializing is further based on whether the at least one of the first condition or the second condition is met a threshold number of times.

11. An apparatus to identify threads responsible for causing a concurrency violation in a multi-threaded computer program,
    the apparatus comprising:
    memory including computer readable instructions; and
    a processor to execute the computer readable instructions, the instructions, when executed to cause the processor to at least:
    define a first condition in a first thread of the multi-threaded program;
    define a second condition in a second thread of the multi-threaded program;
    determine whether at least one of the first or second conditions is met, serialize operations of the first and second threads when at least one of the first or second conditions is met, the serializing of the operations to cause the concurrency violation to occur, wherein the serializing occurs when the first and second conditions are concurrently met; and
    based on the occurrence of the concurrency violation, determine the first and second threads are responsible for the concurrency violation.

12. An apparatus as defined in claim 11, wherein the instructions, when executed, further cause the processor to generate an output based on whether the at least one of the first condition or the second conditions are met.

13. An apparatus as defined in claim 12, wherein the output is based on whether the first and the second conditions are concurrently met.

14. An apparatus as defined in claim 11, wherein the instructions, when executed, further cause the processor to serialize the operations of the first and second threads when the first and second conditions are met within a threshold amount of time.

15. An apparatus as defined in claim 14, wherein the instructions, when executed, further cause the computer to release control of the first thread and the second controller is to release control of the second thread when the first and second conditions are met within the threshold amount of time.

16. An apparatus as defined in claim 11, wherein the operations correspond to a first set of operations, and the instructions, when executed, further cause the processor to:
    invoke the first condition within the first thread and invoke the second condition within the second thread; and
    perform a second set of operations if neither the first condition nor the second condition is met.

17. An apparatus as defined in claim 16, wherein the instructions, when executed, further cause the processor to:
    perform the first set of operations if the at least one of the first and second conditions is met within a threshold amount of time; and
    perform the second set of operations if neither the first condition nor the second condition is met within the threshold amount of time.

18. An apparatus as defined in claim 14, wherein the serializing is further based on whether the first condition and the second condition are met in a defined order.

19. An apparatus as defined in claim 14, wherein the serializing is further based on whether the at least one of the first condition or the second condition is met a threshold number of times.

* * * * *